United States Patent [19]
Nakayama et al.

[11] Patent Number: 5,144,399
[45] Date of Patent: Sep. 1, 1992

[54] COLOR IMAGE PICKUP APPARATUS

[75] Inventors: Masaaki Nakayama, Hirakata; Yoshinori Kitamura, Takatsuki, both of Japan

[73] Assignee: Matsushita Electric Industrial Co., Ltd., Osaka, Japan

[21] Appl. No.: 713,154

[22] Filed: Jun. 11, 1991

[51] Int. Cl.⁵ ............................................... H04N 9/64
[52] U.S. Cl. ........................................ 358/37; 358/166
[58] Field of Search .................................. 358/37, 166

[56] References Cited

FOREIGN PATENT DOCUMENTS

| | | |
|---|---|---|
| 0113462A3 | 7/1984 | European Pat. Off. |
| 0291354A2 | 11/1988 | European Pat. Off. |
| 63-269873 | 11/1988 | Japan. |
| 0279691 | 11/1988 | Japan ..................................... 358/37 |

Primary Examiner—Howard W. Britton
Assistant Examiner—Minsun Oh
Attorney, Agent, or Firm—Wenderoth, Lind & Ponack

[57] ABSTRACT

A color image pickup apparatus for correcting the sharpness of the luminance signal in a color image pickup system for taking out as different color signals for each of the horizontal lines the color information from the objects to be photographed with the use of a color image sensor having a color filter arrangement, whereby it is capable of correcting it even when the signals are saturated in the image sensor and the signal level between the adjacent two horizontal lines has been different in spite of the photographing the object which is the same in the signal level between two adjacent horizontal lines.

10 Claims, 22 Drawing Sheets

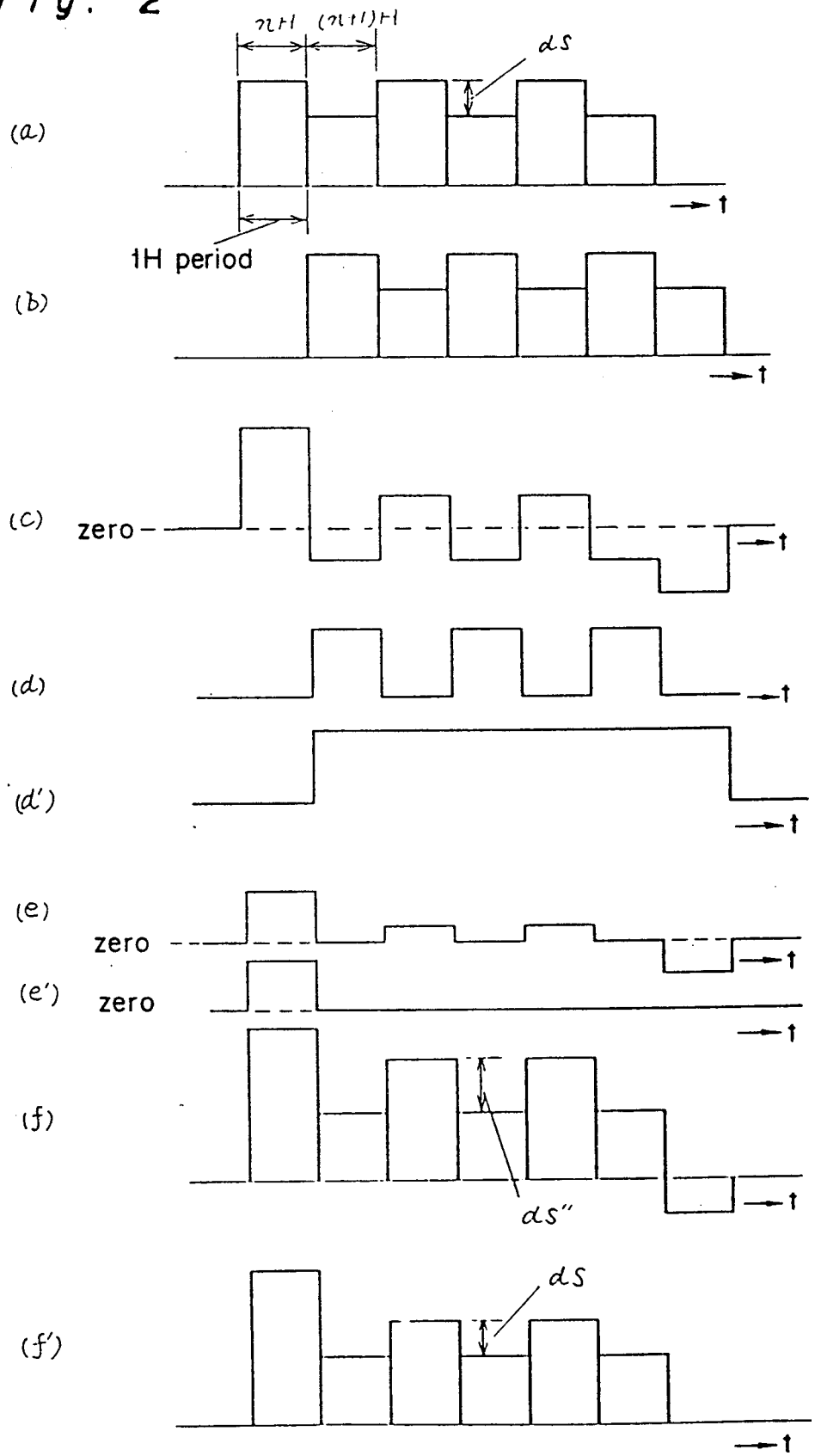

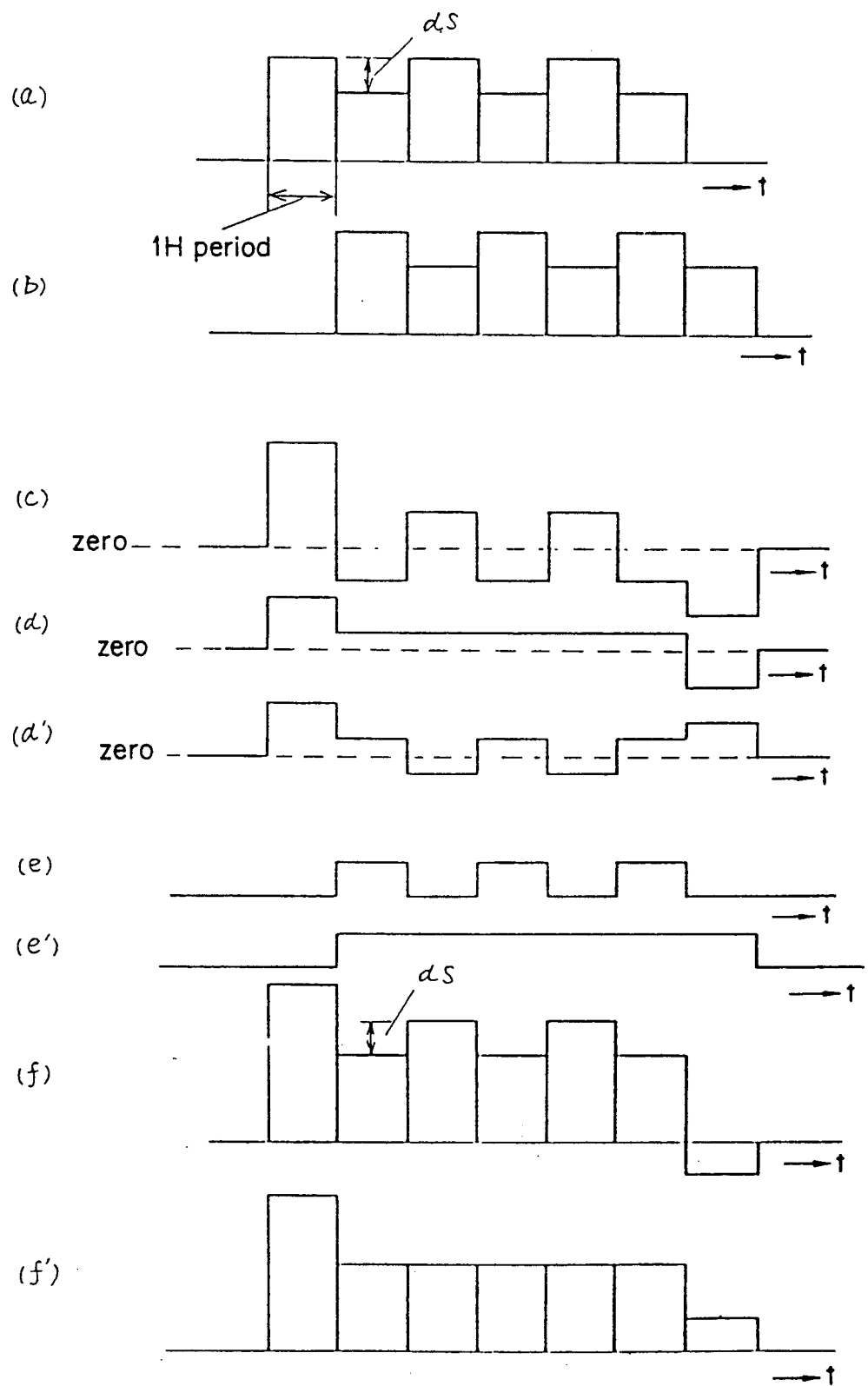

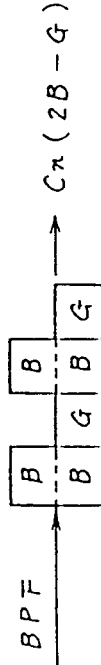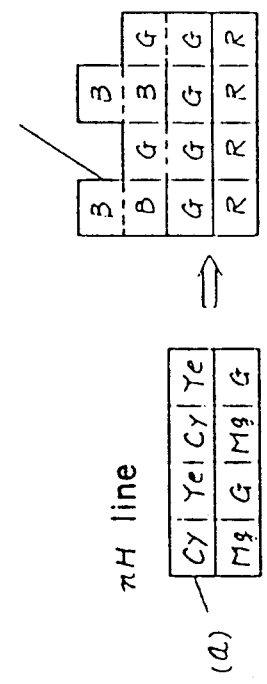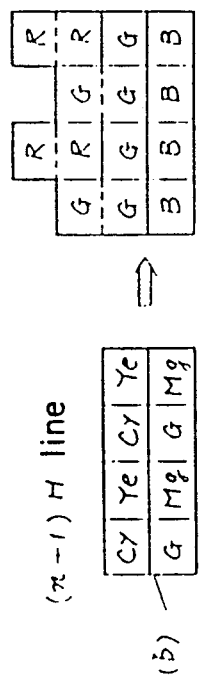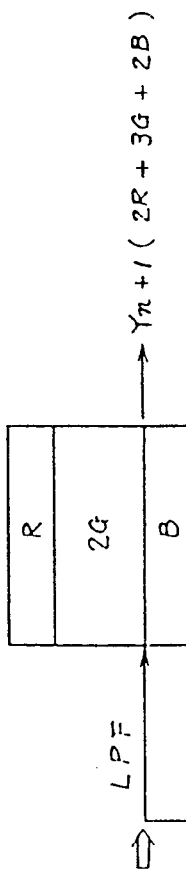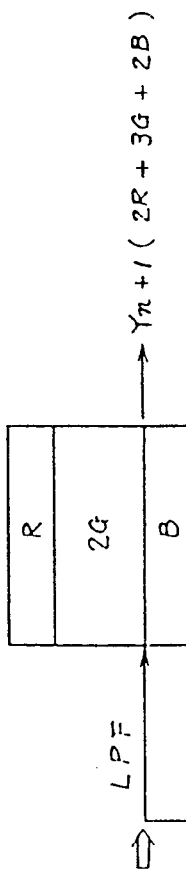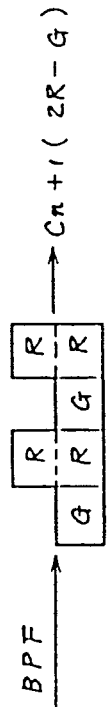

COLOR IMAGE PICKUP APPARATUS

BACKGROUND OF THE INVENTION

The present invention generally relates to a color image pickup apparatus for correcting the sharpness of the luminance signal in a color image pickup system for taking out as different color signals for each of the horizontal lines the color information from the objects to be photographed with the use of a color image sensor having a color filter arrangement face.

In recent years, color image pickup apparatuses with the use of a color image sensor are being popularized quickly by the best use of the characteristics of the smaller size and the lighter weight, and by the advancement in the higher performance. The various types of automatic correctors are further equipped with as higher tendencies. Image pickup apparatuses which are capable of coping with any objects to be photographed are expected. By the proper adjustment of the sharpness thereof even in the image quality, the resolution feelings of the finishing screen are improved. Therefore, the automatic adjustment of the sharpness becomes important in the color image pickup apparatuses.

An example of the color filters of a color image sensor for taking out the color information from the photographed objects as different color signals for each of the horizontal lines with the mosaic shaped color filters being arranged on the front face is shown in FIG. 16. The conventional construction example of the luminance signal processing portion of the color image pickup apparatus is shown in FIG. 21.

In FIG. 21, the construction and operation thereof will be described. The signal to be obtained from the color image sensor 1 is guided into a luminance signal separating circuit 4 and a vertical sharpness correcting signal generating circuit 3. The outputs of both the circuits are added by an adding circuit 6 and the luminance signal with the sharpness of the vertical direction being emphasized therein is obtained. The vertical sharpness correcting signal generating circuit 3 is composed of, for example, one horizontal scanning period delaying circuit (hereinafter 1H delaying circuit) 81, a subtracter 82 for getting the difference signal between the 1H delaying circuit output and the signal not to be delayed by 1H, a low-pass filter (hereinafter referred to as LPF) 83 and an amplifier 84.

The details of the signal to be obtained from the color image sensor 1 and the processing of the luminance signal processing circuit will be described with the use of FIG. 17 and FIG. 20 with the color filters shown in FIG. 16 being arranged as the color image sensor 1.

When the nH line of an odd number field or the n'H line of an even number field is scanned in FIG. 16, the signal to be changed for each of such picture elements as shown in FIG. 17 (a), (c) is outputted from the color image sensor 1. Also, when the (n+1)H line of the even number field or the (n+1)'H of the odd number field is scanned, the signal to be changed for each of such picture elements as shown in FIG. 17 (b), (d) is outputted from the color image sensor 1. From the nH line or the n'H line, the luminance signal of 2R +3G +2B is obtained as the low-pass signal, the color difference signal of 2B-G is obtained as the high frequency modulating signal. From the (n+1)H line or the (n+1)'H line, the luminance signal of the 2R +3G +2B is obtained as the low-pass signal, the color difference signal of 2R-G is obtained as the high frequency modulating signal. The characteristic graph of FIG. 18 shows the relationship between the output level (signal level) of these signals and the size (input light level) of the input light of the color image sensor 1. The straight lines (a) and (b) of FIG. 18 respectively show the signals of the picture elements Ye and Mg of the (n+1)H line or the (n+1)'H line and the signals of the picture elements of Cy and G. One dot chain line (e) shows the average value of both the picture elements, namely, the low-pass signal (luminance signal). Also, the dot lines (c) and (d) of FIG. 18 respectively show the signals of the picture elements of the nH line or n'H line Cy and Mg and the signals of the picture elements of Ye and G. Also, one dot chain line (f) shows the average value of both the picture elements, namely, the low-pass signal (luminance signal). Therefore, the processing of the luminance signal separating circuit 4 basically becomes the processing for removing the high-pass modulating signal through the low-pass filter in the output signal of the color image sensor. As shown in the wave form chart in FIG. 20, the processing of the vertical sharpness correcting signal generating circuit 3 becomes the processing for removing the high frequency modulating signal so as to amplify the proper magnification through the LPF 83 in the difference signal (FIG. 20, the wave form (c)) between the output signal (FIG. 20, the wave form (a)) of the color image sensor 1 and the output signal (FIG. 20, the waver form (b)) of the color image sensor 1 delayed by one horizontal scanning period. Accordingly, the luminance signal with such vertical sharpness shown in FIG. 20, the wave form (d) being corrected therein is obtained into the output of the adding circuit 6 of FIG. 21.

But the conventional color image pickup apparatus of such construction as described hereinabove has the following problem points. The luminance signal to be obtained from the color image sensor 1 is an average signal of two picture elements adjacent to the respective horizontal lines, the value thereof becoming equal in each horizontal line in principle (unless the object to be photographed changes). For example, as the incident light quantity becomes large, the signal from the picture element for generating the large signal level out of the respective picture elements of the color image sensor begins its saturation, with a problem that the luminance signal level of the adjacent two horizontal lines does not conform to each other before all the signals of the other picture elements are saturated. This situation will be described in detail with the use of FIG. 18, FIG. 19, FIG. 22. In the characteristics graph of the above described FIG. 18, the luminance signal level (shown in one dot chain lines (e), (f) in FIG. 18) of the adjacent two horizontal lines agrees with each other from the saturation level S sat of the color image sensor 1 to the incident light quantity L1 where the signal level of each picture element is small. When the incident light quantity exceeds the L1, the signals of the picture elements of the (n+1)H line or the (n+1),H line Ye and Mg shown in the straight line (a) of FIG. 18 are saturated at the S sat. On the other hand, the signals of the picture elements of the Cy and the G in the (n+1)H line or the (n+1)'H line of the straight line (b) of FIG. 18, and the signals of the picture elements of the Cy and the Mg of the nH line or n'H line shown in the dotted lines (c) and (d) of FIG. 18 and the signals of the picture elements of the Ye and the G are not saturated yet so as to increase the signal level as the light quantity is added. The nH line or n'H line luminance signal does not change in the addition of the signal level accompanied by the incident light quantity increase like a straight line (f) in FIG. 18, while the (n+1)H line or the (n+1)'H line luminance signal becomes smaller in the signal level increase accompanied by the incident light quantity increase like a straight line (e) in FIG. 18, thus causing the difference in the luminance signal level of two horizontal lines. FIG. 19 shows a signal wave form chart for each picture element of the respective horizontal lines. FIG. 19 (a) shows the signal level for each of the (n+1)H line or the (n+1)'H line picture element, with the larger one showing the signal of the picture elements of the Ye and the Mg. FIG. 19 (b) shows the signal level of each picture element of the nH line or the n'H line.

When the signals different at the average signal level in the adjacent two horizontal lines as described hereinabove are processed by the signal processing circuit of the conventional color image pickup apparatus of FIG. 21, further the signal level difference of two lines is emphasized as shown in FIG. 22. The wave form (a) of FIG. 22 is the output signal from the color image sensor 1, which has the signal level difference of the dS between the adjacent lines. The wave form (b) of FIG. 22 is a signal thereof delayed by 1H. The wave form (c) of FIG. 22 is a difference signal between the wave form (a) and the wave form (b), and becomes a vertical sharpness correcting signal. The signal level difference dS, between two lines of the output luminance signal corrected in the vertical sharpness shown in the wave form (d) of FIG. 22 becomes larger than the level difference dS in the input signal.

Although it is explained that the signal is saturated by the color image sensor 1, these circuits may be saturated earlier than the color image sensor 1 in, for example, the construction where the amplification circuit and the A/D converting circuit have been arranged immediately after the color image sensor 1 without restriction to this example. Even in these cases, the same problem as described hereinabove occurs.

SUMMARY OF THE INVENTION

Accordingly, the present invention has been developed with a view to substantially eliminating the above discussed drawbacks inherent in the prior art, and has for its essential object to provide an improved color image pickup apparatus.

Another important object of the present invention is to provide an improved color image pickup apparatus, which does not emphasize it, and is capable of correcting it even when the signals are saturated in the image sensor and the signal level between the adjacent two horizontal lines has been different in spite of the photographing the object which is the same in the signal level between two adjacent horizontal lines.

Still another important object of the present invention is to provide a color image pickup apparatus which has the correction and the vertical sharpness emphasis.

In accomplishing these and other objects, according to a first invention, there is provided a color image pickup apparatus which includes a color solid image pickup element for taking out the color information from the object to be photographed, as a color signal different for each of the horizontal lines having a color filter arrangement, a signal level detecting circuit for detecting the signal level for each of the picture elements of the image sensor, a luminance signal separating circuit for separating the luminance signal from the output signal of the image sensor, a correcting signal generating circuit for generating the correcting signal for correcting the sharpness in the vertical direction from the output signal of the above described luminance signal, a controlling circuit for controlling the signal level of the correcting signal or the polarity and signal level by the signal level detecting output, an adding circuit for composing the output signal of the control circuit and the above described luminance signal.

In the first invention, the signal level for each of the picture elements of the color image sensor is detected by the signal level detecting circuit. When the signal level is larger than the reference level, the signal level of the vertical sharpness correcting signal is made smaller or the polarity is reversed, so that the difference of the signal level between the adjacent two horizontal lines is not emphasized even when the signals are saturated by the image sensor and so on. Further, the correcting operation may be effected. Then, the correction and the vertical sharpness emphasis are adapted to be provided with.

According to a second invention, there is a provided color image pickup apparatus which includes a color image sensor for taking out the color information from the object to be photographed, as a color signal different for each of the horizontal lines having a color filter arrangement, a signal level detecting circuit for detecting the signal level for each of the picture elements of the image sensor, an adding circuit for composing the signal of at least two horizontal lines of the output signal of the image sensor, a switching circuit for switching the output signal of the adding circuit and the output signal of the image sensor by the output signal of the signal level detecting circuit, a luminance signal separating circuit for obtaining the luminance signal from the switching circuit output signal, with the switching circuit being adapted to select the adding circuit output when the signal level detecting circuit output has been caused.

In the second invention, the signal level for each of the picture elements of the color image sensor is detected by the signal level detecting circuit. The luminance signal is obtained from the average signals of the adjacent horizontal lines when the signal level is larger than the reference level. Even when the signal is saturated by the image sensor and so on, and the signal level between the adjacent two horizontal lines, this is adapted to be corrected.

A third invention is a color image pickup apparatus which includes a color image sensor for taking out as the different color signal for each of horizontal lines the color signal from the object to be photographed having a color filter arrangement, a signal level detecting circuit for detecting the signal level for each of the picture elements of the color image sensor and generating the control signals when the signal level is larger than the reference level, a first delaying circuit for delaying by one horizontal scanning period the output signal of the solid image pickup element, a second delaying circuit for delaying by one horizontal scanning period the output signal of the first delaying circuit, a first adding circuit for adding the output signal of the color image sensor and the output signal of the second delaying circuit, a multiplying circuit for making the output signal of the first adding circuit one time / two times, a second adding circuit for adding the output signal of the first delaying circuit and the output signal of the multiplying circuit, a subtracter for subtracting the output signal of the multiplying circuit from the output signal of the first delaying circuit, a separating circuit for separating the luminance signal from the output signal of the second adding circuit, a correcting signal generating circuit for generating the correcting signal for correcting the sharpness in the vertical direction from the output signal of the subtracter, a gain control circuit for controlling in a direction of reducing the signal level of the correcting signal from the signal level detecting circuit output, a third adding circuit for composing the output signal and the luminance signal of the gain control circuit.

In a third invention, the luminance signal is obtained from the weighted average signal of the adjacent three horizontal lines, the signal level for each of the picture elements of the color image sensor is detected by the signal level detecting circuit. When the signal level is larger than the reference level, the signal level of the vertical sharpness correcting signal is made smaller, so that it is corrected even when the signal is saturated by the image sensor and the signal level between the adjacent two horizontal lines are different, and also, the vertical sharpness emphasis is normally adapted to be effected.

BRIEF DESCRIPTION OF THE DRAWINGS

These and other objects and features of the present invention will become apparent from the following description taken in conjunction with the preferred embodiment thereof with reference to the accompanying drawings, in which;

FIG. 2 is a wave form chart for illustrating the operation of a first embodiment of the first invention, in an example where the vertical sharpness correcting signal is adapted to be controlled to stop the vertical sharpness correcting signal when the signal of each of the picture elements of the color image sensor detected by the signal level detecting circuit is larger than the reference level;

FIG. 3 is a wave form chart for explaining the operation of a second embodiment of the first invention, in an example where the polarity and the gain of the vertical sharpness correcting signal are controlled when the signal level for each of the picture elements of the color image sensor detected by the signal level detecting circuit is larger than the reference level;

FIG. 4 is a block diagram of a signal level detecting circuit for generating the control signal when the signal level of at least one picture element is larger than the reference level with the adjacent two pictures in the horizontal direction being provided as one unit;

FIG. 6 is a block diagram of a signal level detecting circuit for generating the control signals when the signal level of at least one picture element is larger than the reference level with four picture elements, two picture elements adjacent in the horizontal direction and two picture elements adjacent in the vertical direction, being provided as one unit;

FIG. 7 is a block diagram of a signal level detecting circuit for generating a control signal corresponding to the signal level of the smaller picture element of the signal level from between two picture elements of the above described one unit when the signal level of at least one picture element is larger than the reference level with two picture elements adjacent in the horizontal direction being provided as one unit;

FIG. 9 is a block diagram of a signal level detecting circuit for generating the control signal corresponding to the signal level of the smaller picture element of the signal level from between two picture elements of one unit of the horizontal line to which the picture element where the signal level is larger than the reference level belongs when the signal level of at least one picture element is larger than the reference level with four picture elements, two picture elements adjacent in the horizontal direction and two picture elements adjacent in the vertical direction, being provided as one unit;

FIG. 10 is a block diagram of a signal level detecting circuit for generating the control signal corresponding to the signal level of the picture element smaller at the signal level from between two picture elements of one unit of the horizontal line to which the picture element where the signal level is larger than the reference level belongs when the signal level of at least one picture element is larger than the reference level with four picture elements, two picture elements adjacent in the horizontal direction and two picture elements adjacent in the vertical direction, being provided as one unit;

FIG. 11 is a block diagram showing a first embodiment of the color image pickup apparatus of the second invention of the present invention, in an example where the luminance signal is provided from the average signal of the adjacent horizontal line when the signal level for each of the picture elements of the color image sensor detected by the signal level detecting circuit is larger than the reference level;

FIG. 12 is a block diagram showing a second embodiment of the color image pickup apparatus of the second invention of the present invention in an example where the luminance signal is obtained from the average signal of the adjacent level line when the signal level for each of the picture elements of the color image sensor detected by the signal level detecting circuit is larger than the reference level, and in an example where the 1H delaying circuit of the signal level detecting circuit and the 1H delaying circuit for obtaining the average signal of the adjacent horizontal line are used in common when the signal level has been detected with four picture elements, two picture elements adjacent in the horizontal direction and two picture elements adjacent in the vertical direction, being provided as one unit;

FIG. 17 and FIG. 19 are models of signals to be obtained from the color image sensor with the color filters of FIG. 16 being arranged on them;

DETAILED DESCRIPTION OF THE INVENTION

Figure 1:
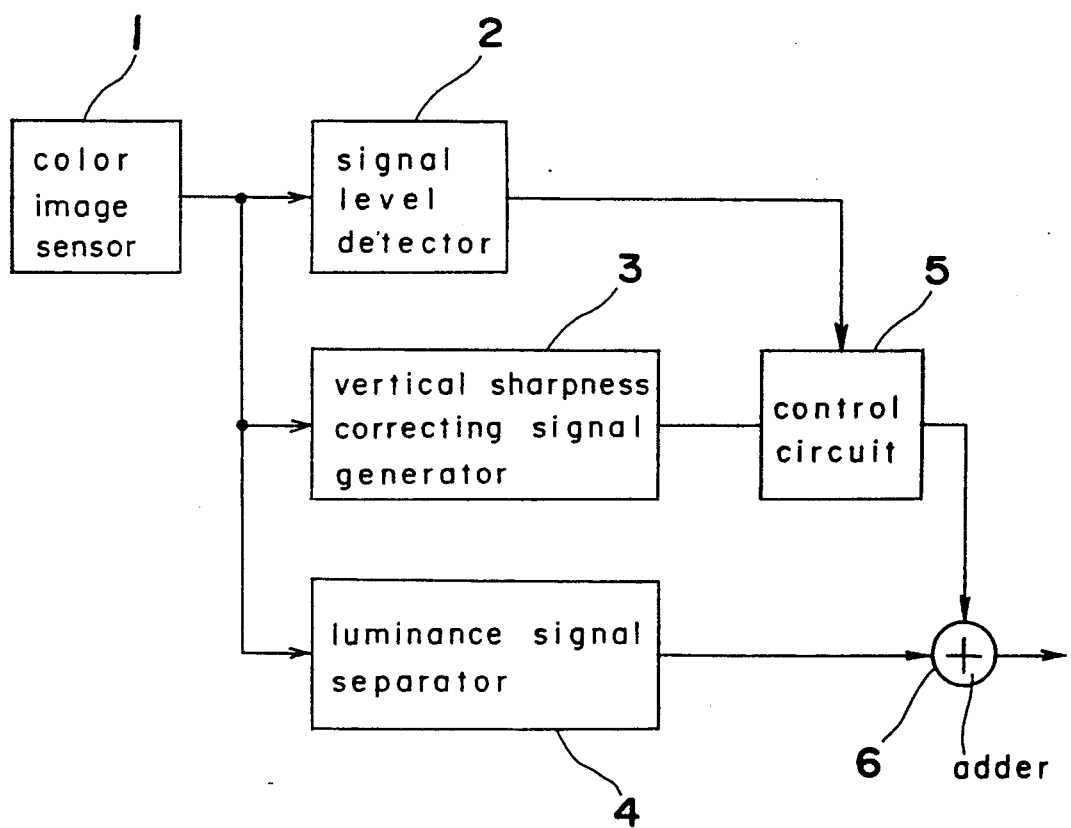
FIG. 1 is a block diagram of a color image pickup apparatus of a first invention of the present invention.

Before the description of the present invention proceeds, it is to be noted that like parts are designated by like reference numerals throughout the accompanying drawings.

(1) (Embodiment: Basic Construction)

A color image pickup apparatus in the embodiment of the present invention will be described hereinafter with reference to the drawings.

FIG. 1 is a block diagram showing the basic construction of a first invention of the present invention.

Figure 16:
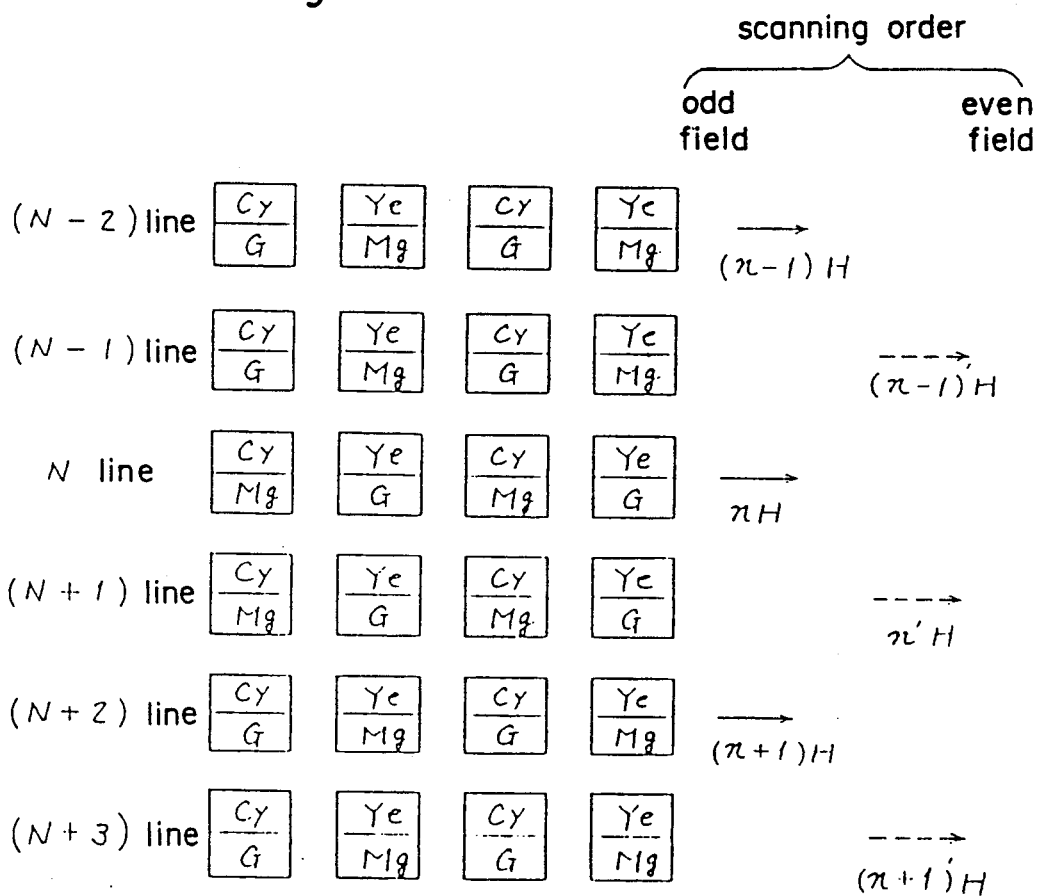
FIG. 16 is an example of a construction view of color filters arranged on the front face of the color image sensor to be used for the color image pickup apparatuses of the present invention and the conventional embodiment.
Figure 18:
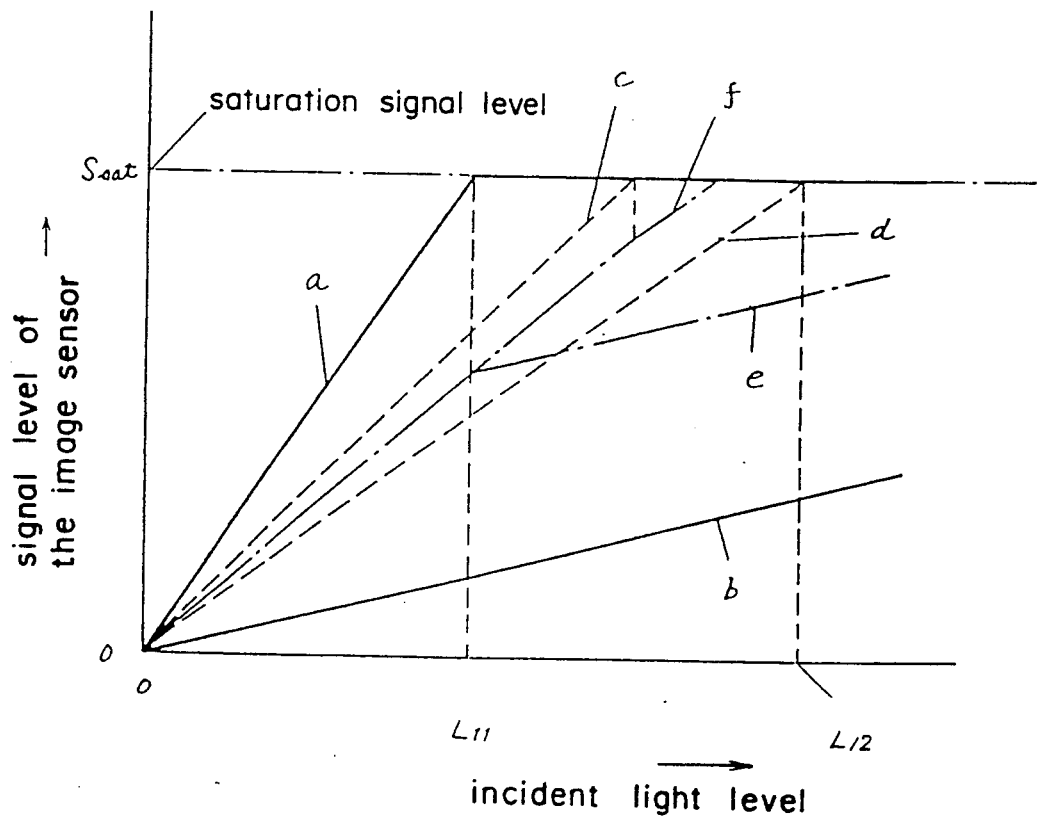
FIG. 18 is a characteristics chart showing the input, output characteristics of the signals to be obtained from the color image sensor with the color filters being arranged on them.
Figure 19:
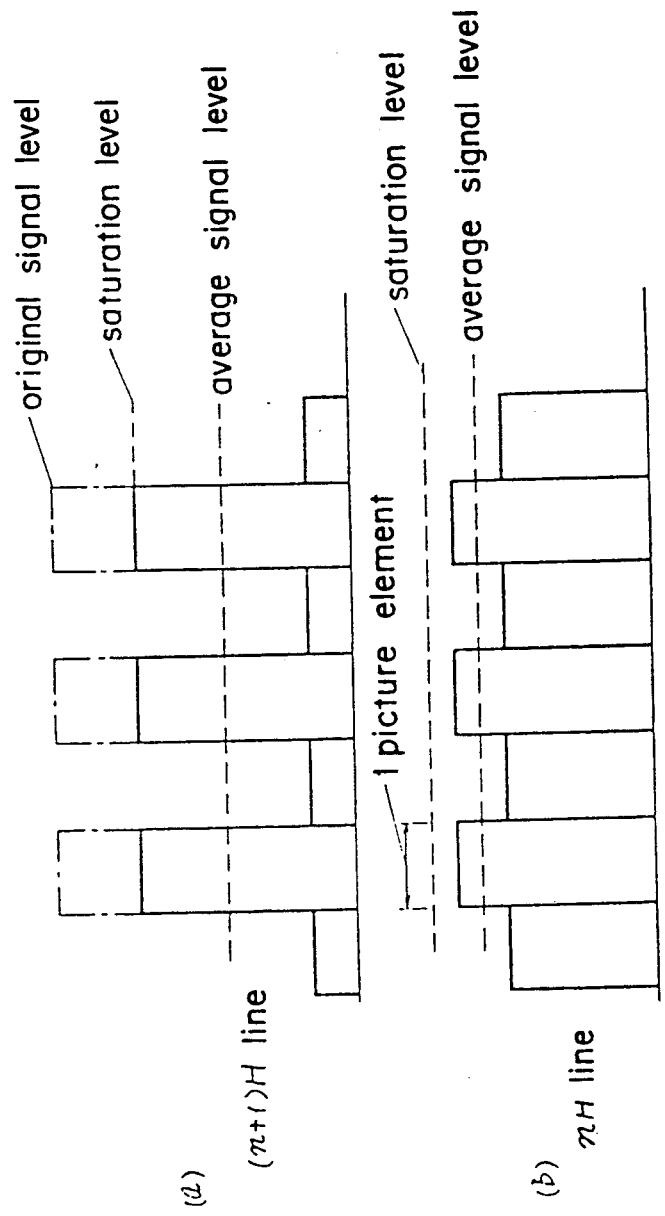
Figure 20:
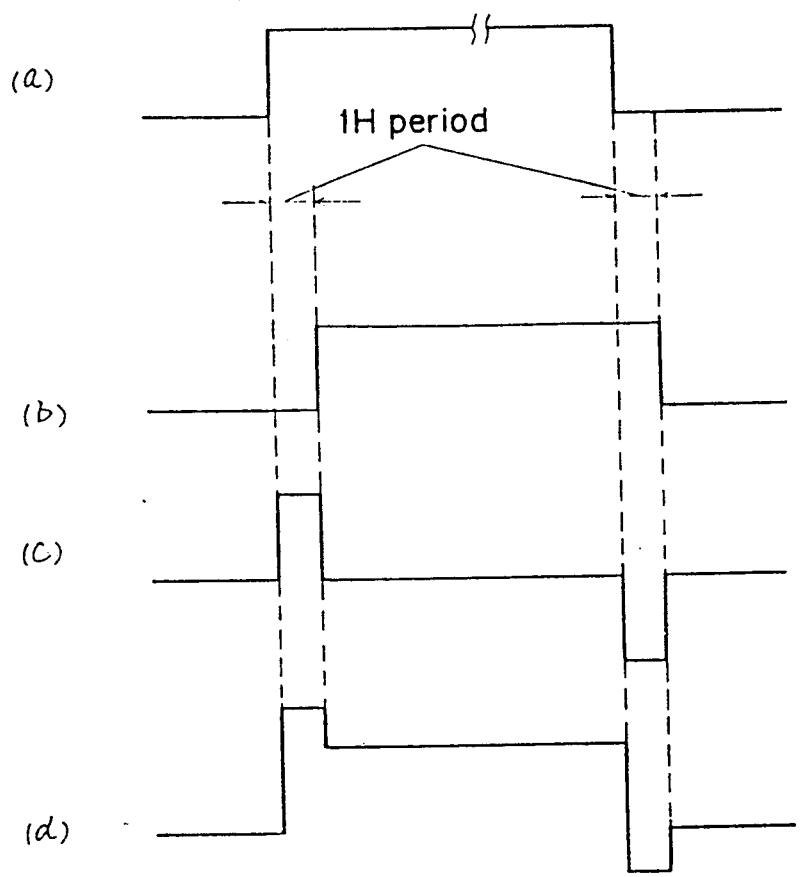
FIG. 20 is a wave form chart for explaining the processing of obtaining the luminance signal emphasizing the vertical sharpness from the signal to be obtained from the color image sensor with the color filters of FIG. 16 being arranged on them.
Figure 21:
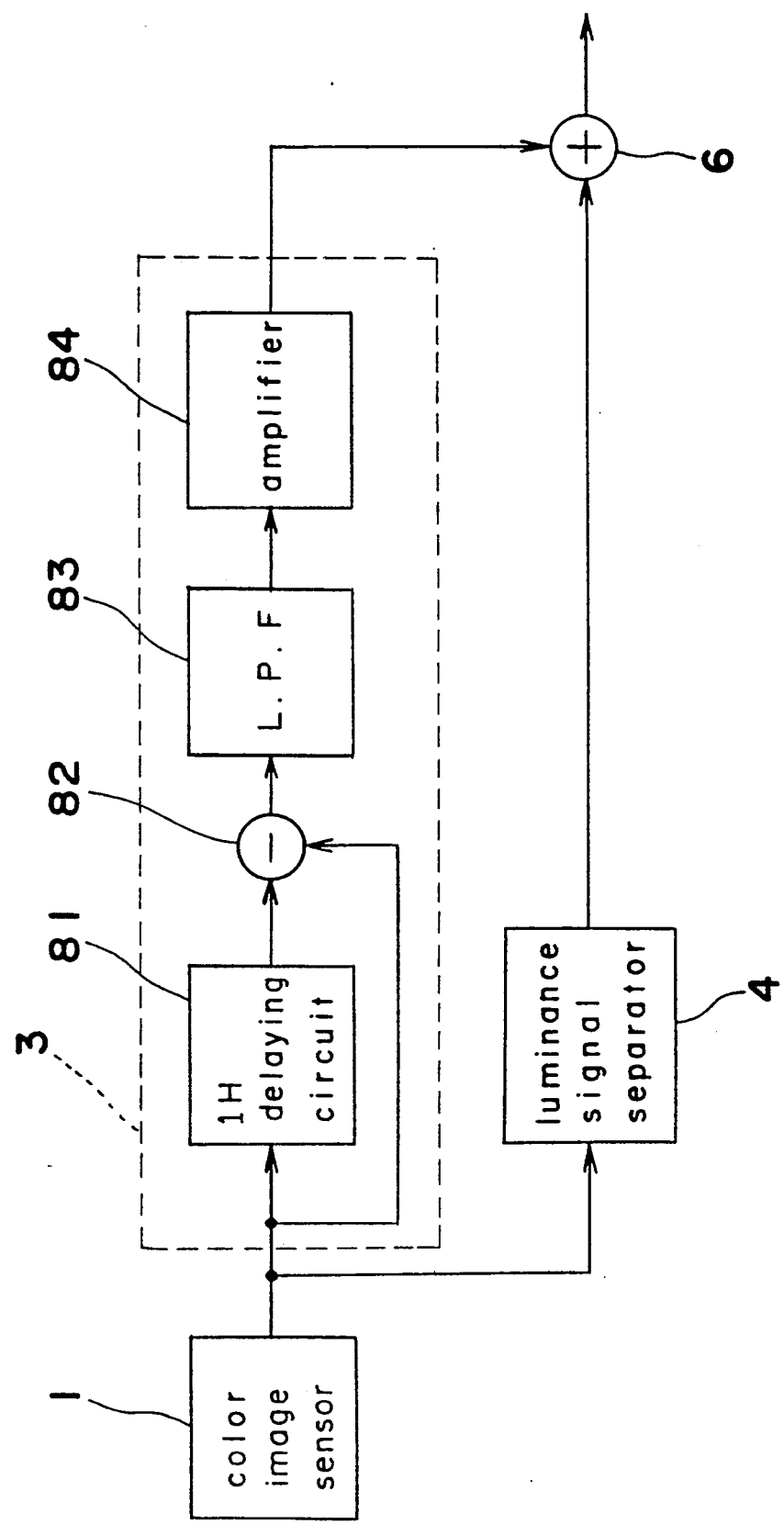
FIG. 21 is a block diagram showing the construction of the conventional color image pickup apparatus.

In FIG. 1, the construction and the operation thereof will be described. Reference numeral 1 is a color image sensor with color filters shown in FIG. 16 being arranged on them. The signals to be obtained from the color image sensor 1 and the processing of obtaining the luminance signals from the signals will be described in detail hereinafter. When the odd number field of nH line or the even number field of n'H line is scanned in FIG. 16, the signals to be changed for each of the picture elements as shown in FIG. 17 (a), (c) are outputted from the color image sensor 1. Also, when the odd number field of (n+1)H line or the even number field of (n+1)'H is scanned, the signals to be changed for each of the picture elements as shown in FIG. 17 (b), (d) are outputted from the color image sensor 1. The luminance signals of 2R +3G +2B are obtained as low-pass signals, the color difference signals of 2B-G are obtained as the high frequency modulating signals from the nH line or the n'H line. The luminance signals of 2R +3G +2B are obtained as the low-pass signals, the color difference signal of 2R-G are obtained as the high frequency modulating signals from the (n+1)H line or the (n+1)'H line. The characteristics chart of FIG. 18 shows the relationship between the output level (signal level) of these signals and the size (input light level) of the input light of the color image sensor 1. Namely, the straight lines (a) and (b) of FIG. 18 respectively show the signals of the picture elements of the (n+1)H line or the (n+1)'H line of Ye and Mg and the signals of the picture elements of the Cy and G, the one dot chain line (e) thereof shows the average value of both the picture elements, namely, the low-pass signal (luminance signal), also, the dot lines (c) and (d) of FIG. 18 show respectively the signals of the picture elements of the nH line or n,H line of Cy and Mg, and the signals of the picture elements of the Ye and the G, also one dot chain line (f) shows the average value of both the picture elements, namely, the low-pass signal (luminance signal). Therefore, the luminance signal separation processing basically removes the high-pass modulating signal through the low-pass filter in the output signal of the color image sensor. The vertical sharpness correcting signal generating processing removes the high frequency modulating signal through the low-pass filter (LPF) in the difference signal (FIG. 20, the wave form (c)) between the output signal (FIG. 20, the wave form (a) of the color image sensor 1 and the output signal (FIG. 20, the wave form (b)) of the color image sensor 1 delayed by one horizontal scanning period so as to effect the amplification of the proper multiplying factor. By the addition of the above described luminance signal and the vertical sharpness correcting signal, the brilliance signal whose vertical sharpness is corrected as shown in FIG. 20, the wave form (d) is obtained.

In the present invention, the output signal of the color image sensor 1 is guided into the vertical sharpness correcting signal generating circuit 3 and the luminance signal separating circuit 4 and is guided into the signal level detecting circuit 2 so as to detect the signal level for each picture element. The output signal of the signal level detecting circuit 2 controls the signal from the vertical sharpness correcting signal generating circuit 3 by the control circuit 5, and the output signal of the control circuit 5 is added to the above described luminance signal separating circuit 4 by the adding circuit 6.

The first embodiment in the basic construction will be described hereinafter in detail with the use of the wave form chart of FIG. 2. The embodiment is an example where the control circuit 5 controls the stopping of the signal from the vertical sharpness correcting signal generating circuit 3.

When the signal of the horizontal two lines adjacent from the color image sensor 1 is saturated in the signal of the picture element on one side of the one horizontal line as shown in the wave forms (a) and (b) of FIG. 17 or the wave forms (a) and (b) of FIG. 5, the wave form expressing for each horizontal period (hereinafter referred to as 1H period) the output signal of the color image sensor becomes a signal having the level difference for each 1H in FIG. 2, the wave form (a). Accordingly, the difference signal between the signal and the signal delayed by 1H (FIG. 2, the wave form (b)) becomes FIG. 2, the wave form (c).

Figure 4A:
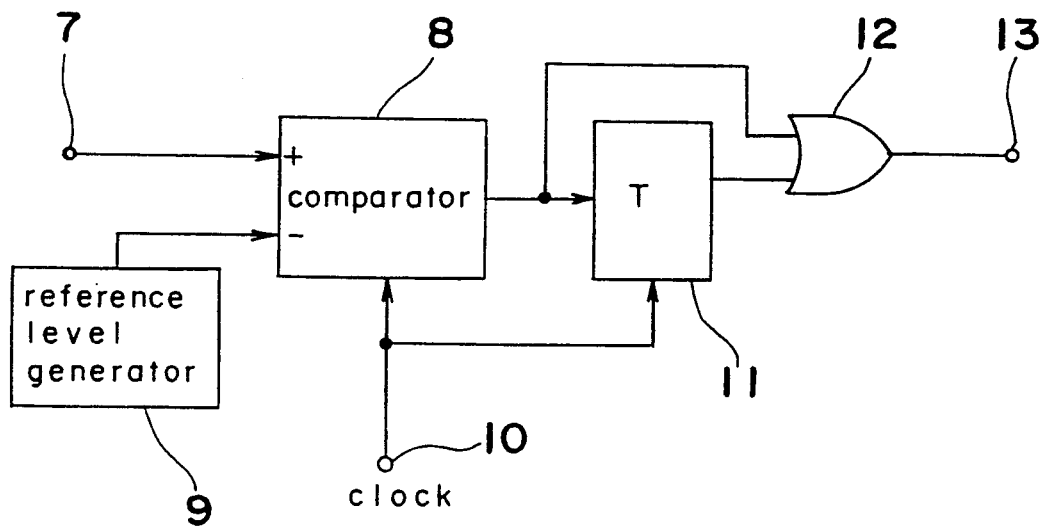
FIG. 4, FIG. 6, FIG. 7, FIG. 9 and FIG. 10 are block diagrams showing the detailed circuit embodiment of the signal level detecting circuit to be used in the present invention.
Figure 4B:
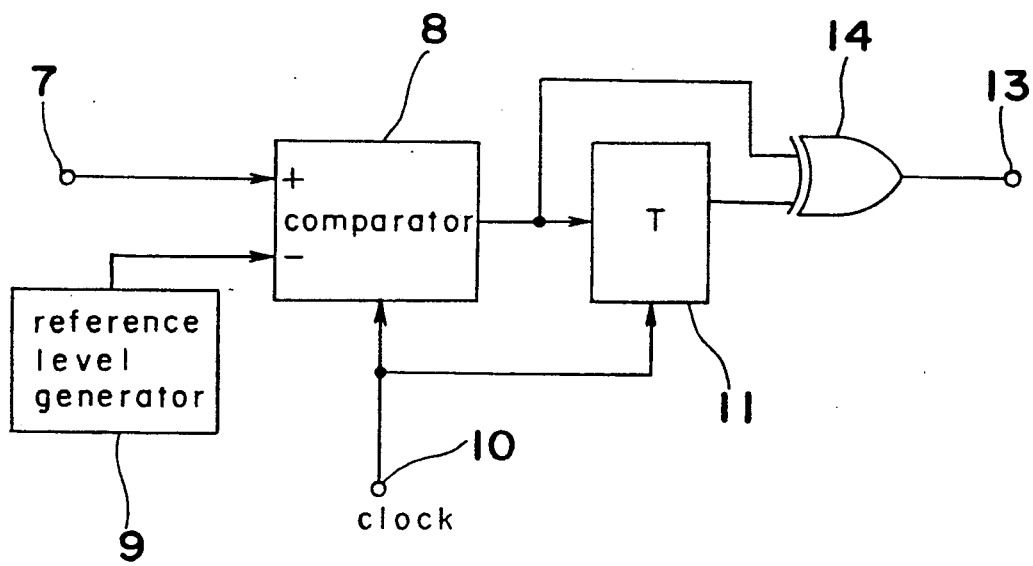

The construction shown in, for example, FIG. 4 (a) is considered as the first example of the signal level detecting circuit 2. The signal of the color image sensor 1 is guided into the input terminal 7 so as to compare for each picture element with the reference level from the reference level generator 9 by the comparator 8. The output of the comparator 8 is guided into the 1 picture element delaying circuit 11, and also, the "or" with respect to the output of the 1 picture element delaying circuit 11 is provided by the "or" circuit 12. Assume that the signal to be inputted into the input terminal 7 is such a wave form signal as shown in FIG. 5 (a), and the reference level is a value a little smaller than the saturation level of FIG. 2, and the output of the comparator 8 becomes a signal high at level at the timing of the picture element saturated at the signal level as shown in FIG. 5 (c), and becomes a signal low at level at the timing of the picture element not saturated at the signal level. Therefore, the output of the 1 picture element delaying circuit 11 becomes the wave form (d) of FIG. 5, the output of the "or" circuit 12, namely, the output of the signal level detecting circuit 2 becomes a signal shown in the wave form (e) in FIG. 5.

The clock which is in conformity with the picture element period is guided into the comparator 8 and 1 picture element delaying circuit 11 and is capable of comparison and 1 clock of delaying for each picture element.

Figure 5:
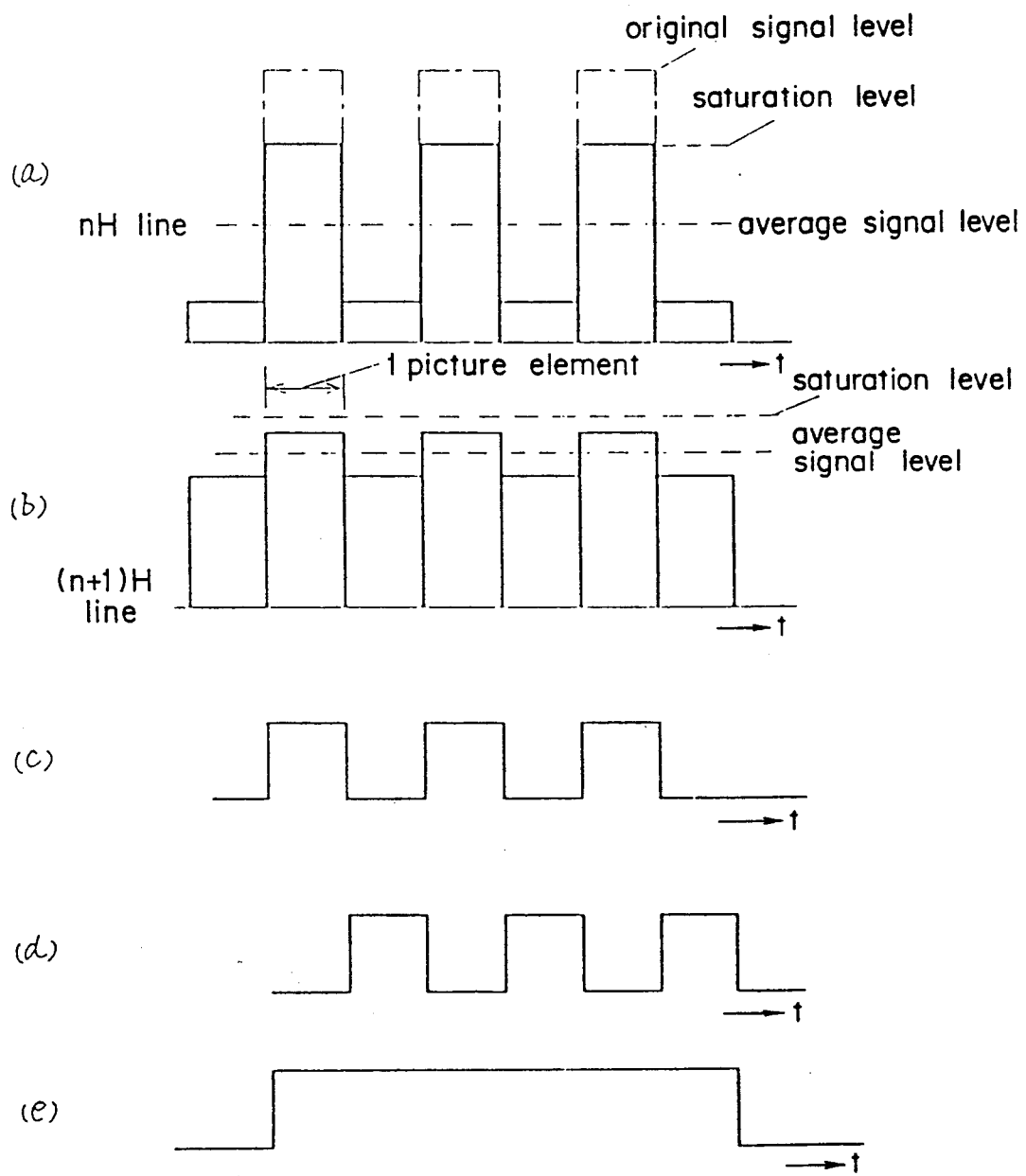
FIG. 5 is a wave form chart for explaining the operation of the signal level detecting circuit.
Figure 22:
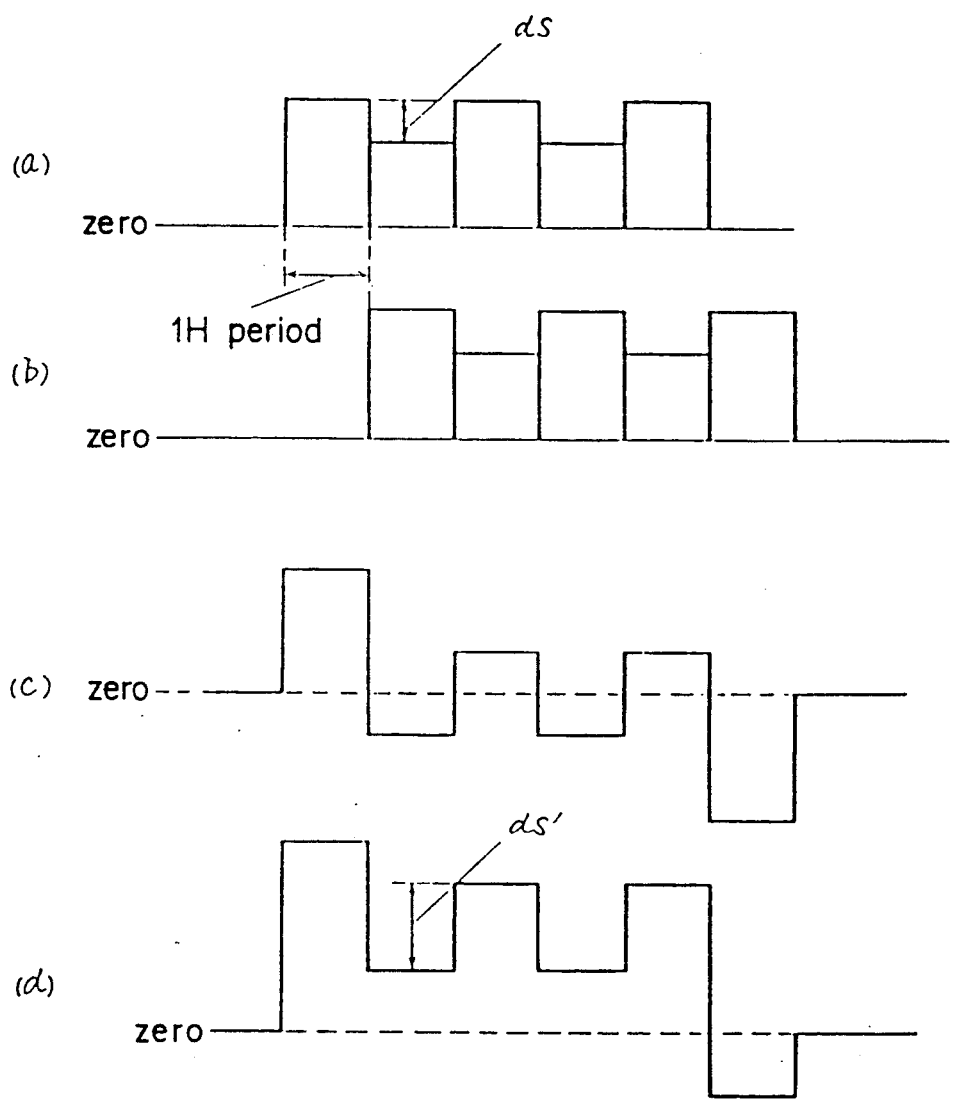
FIG. 22 is a wave form chart for explaining the characteristics of the conventional embodiment.

FIG. 5, the wave form (e) is provided as FIG. 2, the wave form (d) when it is expressed for each 1H period. This shows that the signal level detecting circuit 2 outputs the high level signal only for the horizontal line period during which the saturation is being caused. During the period, the control circuit 5 controls the stopping of the signal from the vertical sharpness correcting signal generating circuit 3. Therefore, the controlled vertical sharpness correcting signal becomes a signal shown in FIG. 2, the wave form (e). The output signal to be obtained from the adding circuit 6 is provided in FIG. 2, the wave form (f). The signal level difference for each 1H period becomes dS,, and becomes larger than the level difference dS of the original signal, but becomes smaller than the level difference dS' in the conventional example of FIG. 22 (d), thus resulting in effects in the present embodiment.

(2) (Embodiment: Basic Construction + Second Signal Level Detecting Circuit)

FIG. 4 (b) is a second example of a signal level detecting circuit 2). In this example, the "or" circuit 12 in a first example shown in FIG. 4 (a) is provided as an exclusive or circuit 14, and the saturation detecting signal is adapted not to be outputted when both the two picture elements adjacent in the horizontal direction have been saturated. In such a case, the deterioration of the vertical sharpness of the vertical edge portion is effected no more. This is because the saturation may be detected from the line with at least one picture element of the line on the single side of the two horizontal lines adjacent in the vertical direction being saturated when both the two picture elements adjacent in the horizontal direction as clear from FIG. 18 are saturated. The operation of the basic construction of FIG. 1 in this example in a case except for it is the same as the example of the above described first signal level detecting circuit.

(3) (Embodiment: Basic Construction + Third Signal Level Detecting Circuit)

Figure 6A:
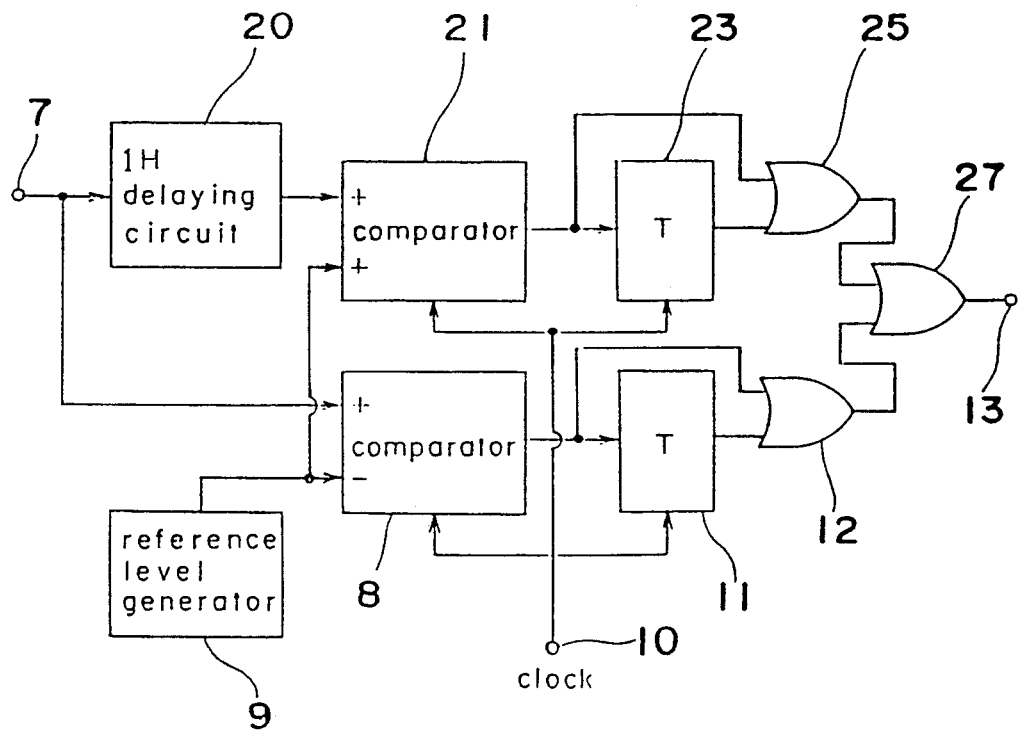
Figure 6B:
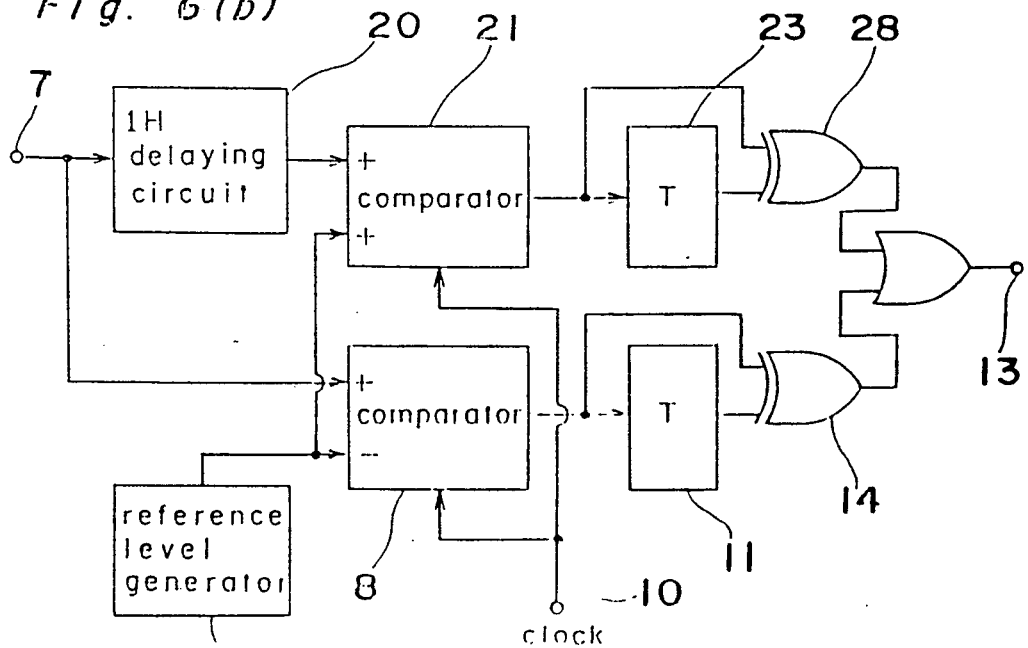

FIG. 6 (a) is a third example of the signal level detecting circuit 2. As the like parts are designated by like reference numerals throughout the same portions as the first example of FIG. 4 (a) in the example, the 1H delaying circuit 20, the second comparator 21, the second 1 picture element delaying circuit 23, the second "or" circuit 25 are added to the first example. The input signal 1H delayed at the signal level is also detected and the "or" with respect to the signal for detecting the level of the signal not delayed by the third "or" circuit 27 is provided, so that the signal level detecting circuit is adapted to generate the control signal when the saturation of the signal has been caused even in the either single line of the two adjacent horizontal lines. When the signal shown in the FIG. 2, the wave form (a) is outputted from the color image sensor 1, the signal to be outputted from the level detecting circuit 2 becomes a signal shown in the FIG. 2, the wave form (d)', the signal to be outputted from the control circuit 5 is provided as shown in FIG. 2, the wave form (e)', and the output signal to be obtained from the adding circuit 6 is shown in FIG. 2, the wave form (f)'. The signal level difference for each of lH periods becomes dS, and becomes the same as the level difference dS of the original signal, so that the level difference increase by passing through the vertical sharpness correcting signal generating circuit is removed, thus resulting in large effect in the present embodiment.

(4) (Embodiment: Basic Construction + Fourth Signal Level Detecting Circuit)

FIG. 6 (b) is a fourth example of the signal level detecting circuit 2. In the example, the "or" circuit 12 in the third example of FIG. 6 (a) and the second "or" circuit 25 are the exclusive or circuits 14, 28. In a third example as shown in the second example of the above described signal level detecting circuit 2, the deterioration of the vertical sharpness of the vertical edge portion in such a case is effected no more in such construction where the saturation detecting signal is adapted not to be outputted when both the adjacent two picture elements in the horizontal direction have been saturated. The description is omitted, because the operation of the circuit and the effect are apparent from the example from FIG. 4 (b) and the FIG. 6 (a).

(5) (Embodiment: Polarity And Gain Control Of Vertical Acute Degree Correcting Signal)

FIG. 3 is a wave form chart showing a second embodiment of the basic construction of a first invention of FIG. 1. The example is adapted to correct the signal level difference between the horizontal lines when the picture element signal has been saturated through the controlling of the polarity and the gain of the signal from the vertical sharpness correcting signal generating circuit 3 by the control circuit 5, the above described first embodiment does not emphasize the signal level difference, thus resulting in much larger effects.

The wave forms (a), (b), (c) of FIG. 3 are respectively a signal which has difference caused between the lines by the signal saturation to be inputted from the color image sensor 1, the 1H delaying signal and the difference signal of both the signals. When the level detecting circuit 2 is in a first or a second example of the above described FIG. 4 (a) or (b), the signal from the level detecting circuit 2 becomes a signal shown in FIG. 3, the wave form (e). As the control circuit 4 is adapted to amplify the input signal with a proper scale factor and the signal is adapted to effect the reversing control operation of the polarity of the input signal when the signal is high at level, the output signal of the control circuit 4 becomes a signal shown in FIG. 3, the wave form (d). Therefore, the output signal to be obtained from the adding circuit 6 is provided as shown in FIG. 3, the wave form (f). The signal level difference for each of 1H periods becomes dS, and becomes the same as the level difference dS of the original signal, the level difference increase is provided no more by passing through the vertical sharpness correcting signal generating circuit, thus resulting in effects even in the present embodiment.

When the level detecting circuit 2 in the present embodiment is in the third, fourth examples of the above described FIG. 6 (a) or (b), the signal from the level detecting circuit 2 becomes a signal shown in FIG. 3, the wave form (e)'. As described hereinabove, the control circuit 5 amplifies the input signal with a proper scale factor and also, the signal effects the reversing control of the polarity of the input signal when the signal is high at a level, so that the output signal of the control circuit 5 becomes a signal as shown in FIG. 3, the wave form (d)', and therefore, the output signal to be obtained form the adding circuit 6 is shown in FIG. 3, the wave form (f)'. The signal level difference for each of 1H periods is provided no more, the vertical sharpness emphasis and the correction of the signal level difference between the lines are effected, thus resulting the effects in the present embodiment.

(6) (Embodiment: The Fifth Signal Level Detecting Circuit Construction)

Figure 7:
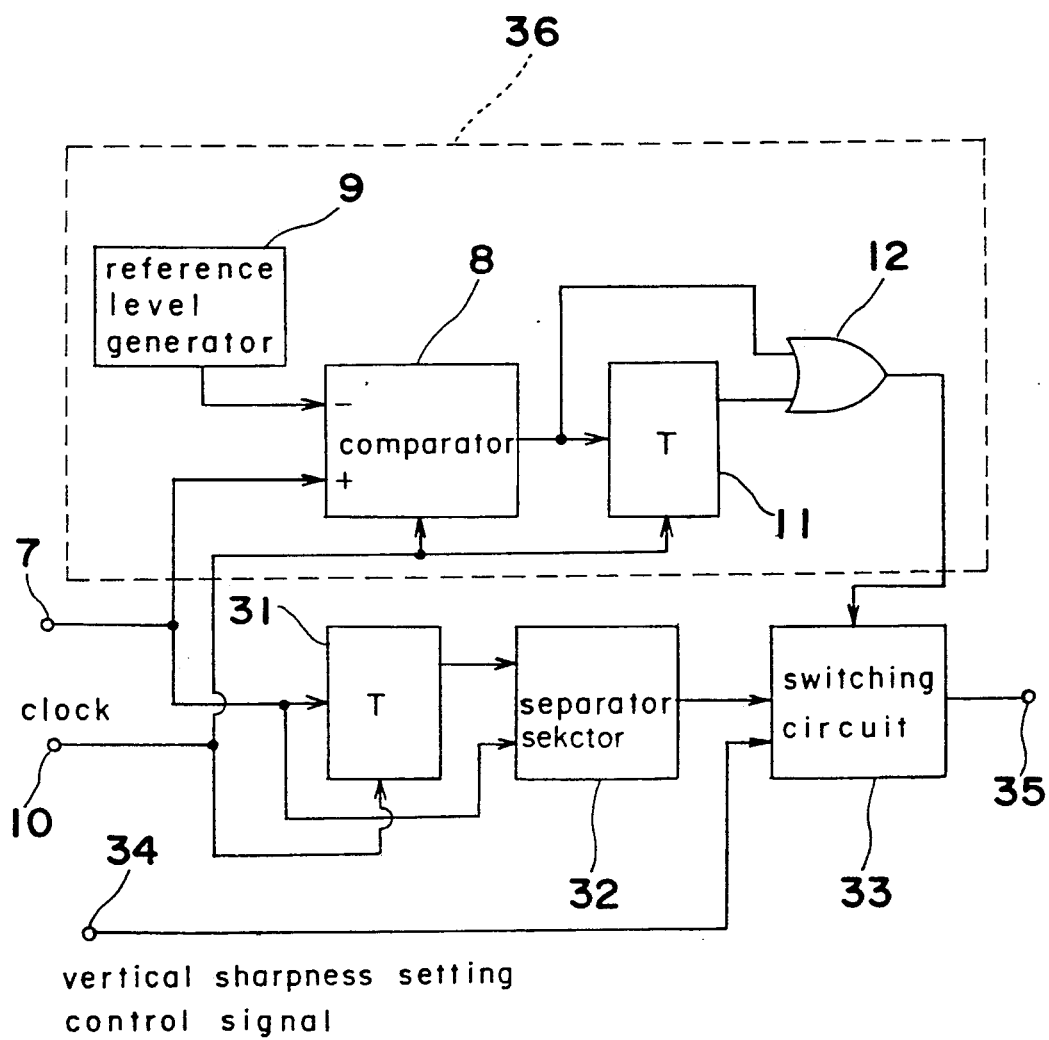

FIG. 7 is a fifth example of the signal level detecting circuit 2, the difference with respect to the example up to the above description is that in the above described example, the output signal of the color image sensor 1 is saturated, and all the uniform control signals are adapted to be generated, while in the present embodiment, the control signal corresponding to the condition of the saturation signal is adapted to be generated.

The signal from the color image sensor 1 is inputted to the input terminal 7 as shown in FIG. 7, and the signal is detected as to whether or not the saturation of the signal from the color image sensor 1 exists by the saturation detecting circuit 36 using the construction the same as the circuit shown in FIG. 4 (a). The signal to be inputted to the input terminal 7 is guided even into the third 1 picture element delaying circuit 31 and is delayed by one picture element, and the smaller signal of the signal not delayed or the signal delayed by one picture element is selected by the selecting circuit 32. The output signal of the selecting circuit 32 is guided into the switching circuit 33. The vertical sharpness setting control signal for setting the vertical sharpness emphasis when the signal of the color image sensor 1 is not saturated is inputted into the other input terminal 34 of the switching circuit 33. The two input signals are switched with the control signal from the saturation detecting circuit 36 and are outputted into the output terminal 35. When the saturation detecting circuit 36 does not detect the saturation of the signal, the vertical sharpness setting control signal is outputted into the output terminal 35. In the color image pickup apparatus of the present invention of FIG. 1, the control amount from the vertical sharpness correcting signal generating circuit 3 is set so as to emphasize the vertical sharpness. When the saturation detecting circuit 36 detects the saturation of the signal, the output signal of the selecting circuit 32 is outputted to the output terminal 35.

Figure 8:
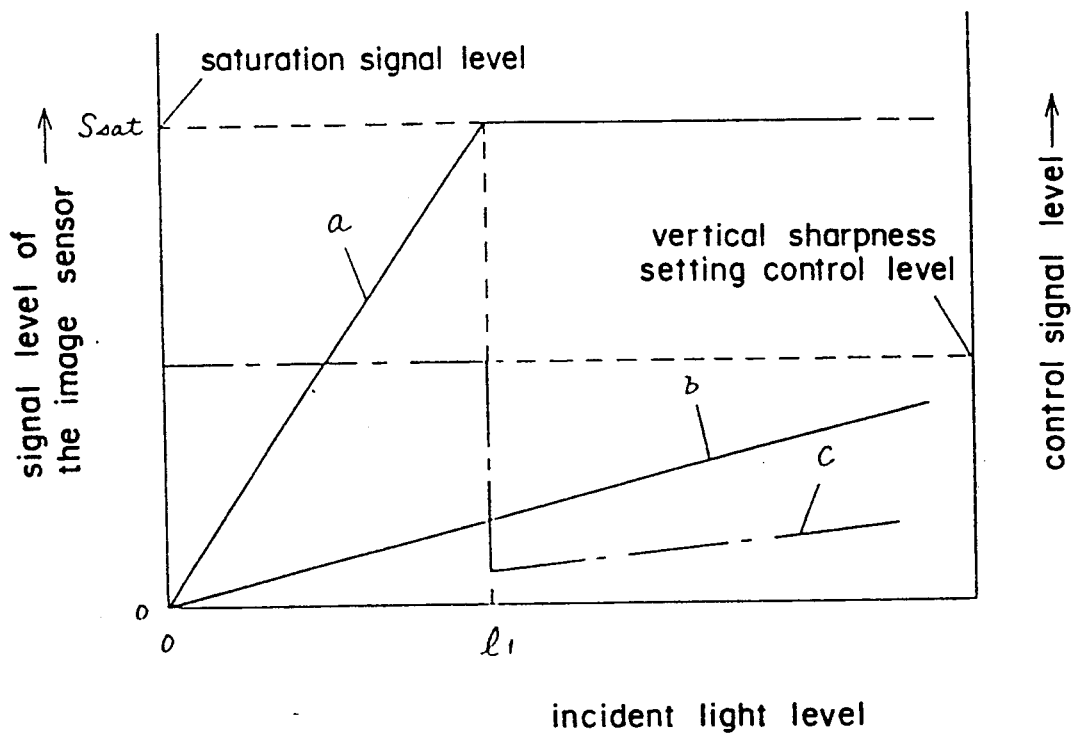
FIG. 8 is a characteristics graph of the input, output characteristics of the color image pickup element showing the relationship between the input light level and the output signal level.

The output signal of the output terminal 35 will be described further with the use of FIG. 8. The solid straight lines (a) and (b) of FIG. 8 show the straight lines (a) and (b) of FIG. 20 and show the output signal level with respect to the incident light amount of two picture elements of one horizontal line of the color image sensor 1. The curve line (c) of FIG. 8 shows the output signal of the output terminal 35, namely, the vertical sharpness controlling signal. It is the value of the vertical sharpness setting control signal level while the incident light quantity where signal of the color image sensor 1 is not saturated is smaller than L1, the level becomes the signal level corresponding to the signal (FIG. 8, the curve line (b)) of the picture element not saturated when the signal of the color image sensor 1 starts its saturation. Namely, when the signal has been saturated, the value of the vertical sharpness control signal is made smaller when the signal level of the picture element not saturated is smaller, and the value of the vertical sharpness control signal is made larger when the signal level of the picture element not saturated is larger so as to effect the controlling operation of respectively decreasing or increasing the emphasis of the vertical sharpness.

By such controlling operation, the signal level difference between the horizontal lines when the signal has been saturated is also large when the signal level difference between the picture elements are generally large. On the other hand, when the signal level difference between the picture elements is small, the signal level difference between the horizontal lines when the signal has been saturated is also small, with an advantage that the conventional problem points may be reduced without making the signal level difference between the horizontal lines conspicuous or without the unnecessary deterioration of the vertical sharpness.

The saturation detecting circuit 36 to be used in the above described example is not necessary to be restricted to the above described circuit example. It is clear that the circuit construction of the FIG. 4 (b), FIG. 6 (a), (b) which are in the above described second, third, fourth examples of the above described signal level detecting circuit 2 may be used. The signal of the line to be saturated is required to be guided into the selecting circuit 32 when the example where the saturation detecting signal is adapted to be caused when the signal is saturated even in either line of adjacent two lines with the use of the 1H delaying circuit as in the example of FIG 6 (a), (b). Such example is shown in FIG. 9 and FIG. 10.

(7) (Embodiment: Detailed Construction Example 1 of Fifth Signal Level Detecting Circuit)

Figure 9:
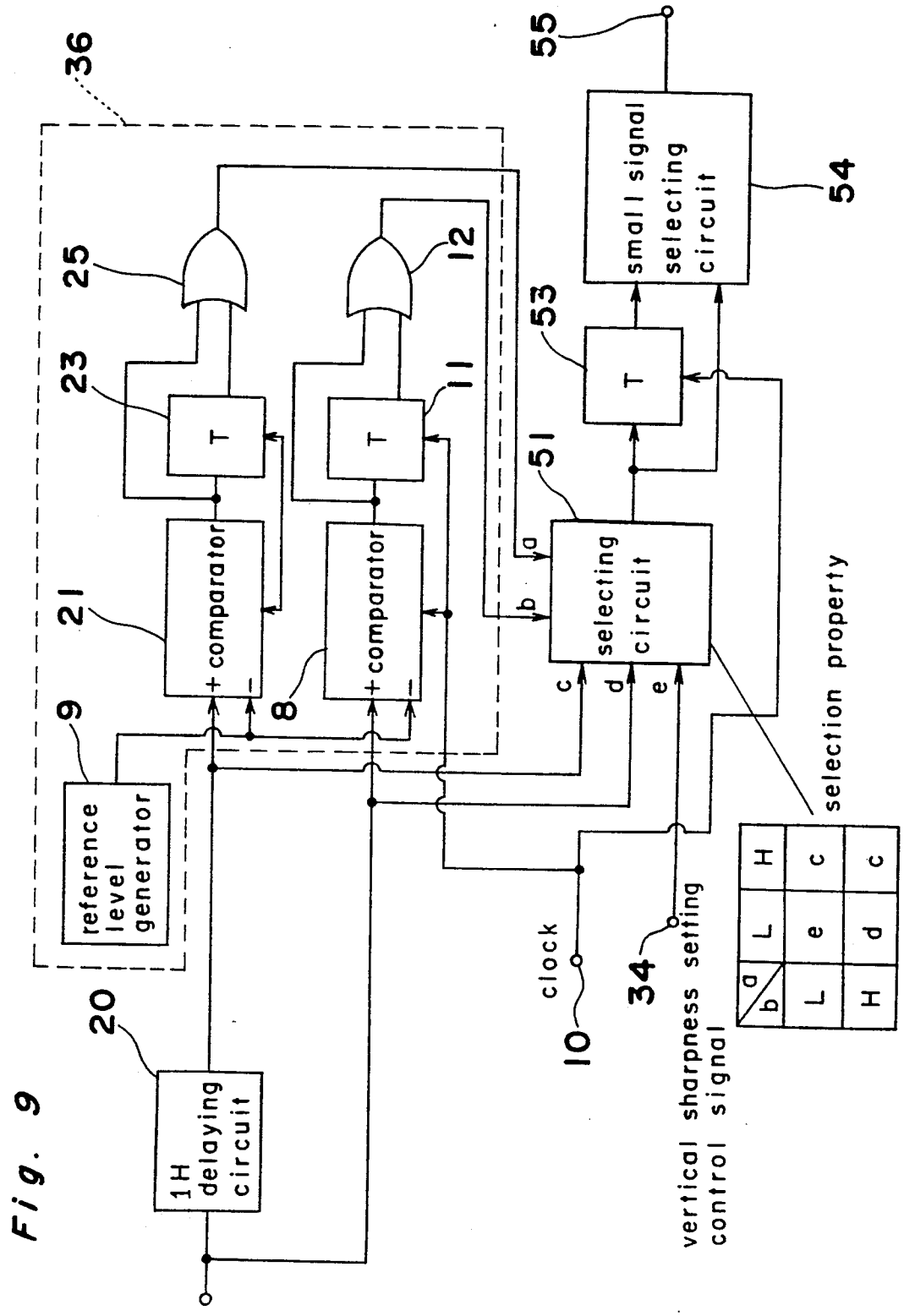
Figure 10:
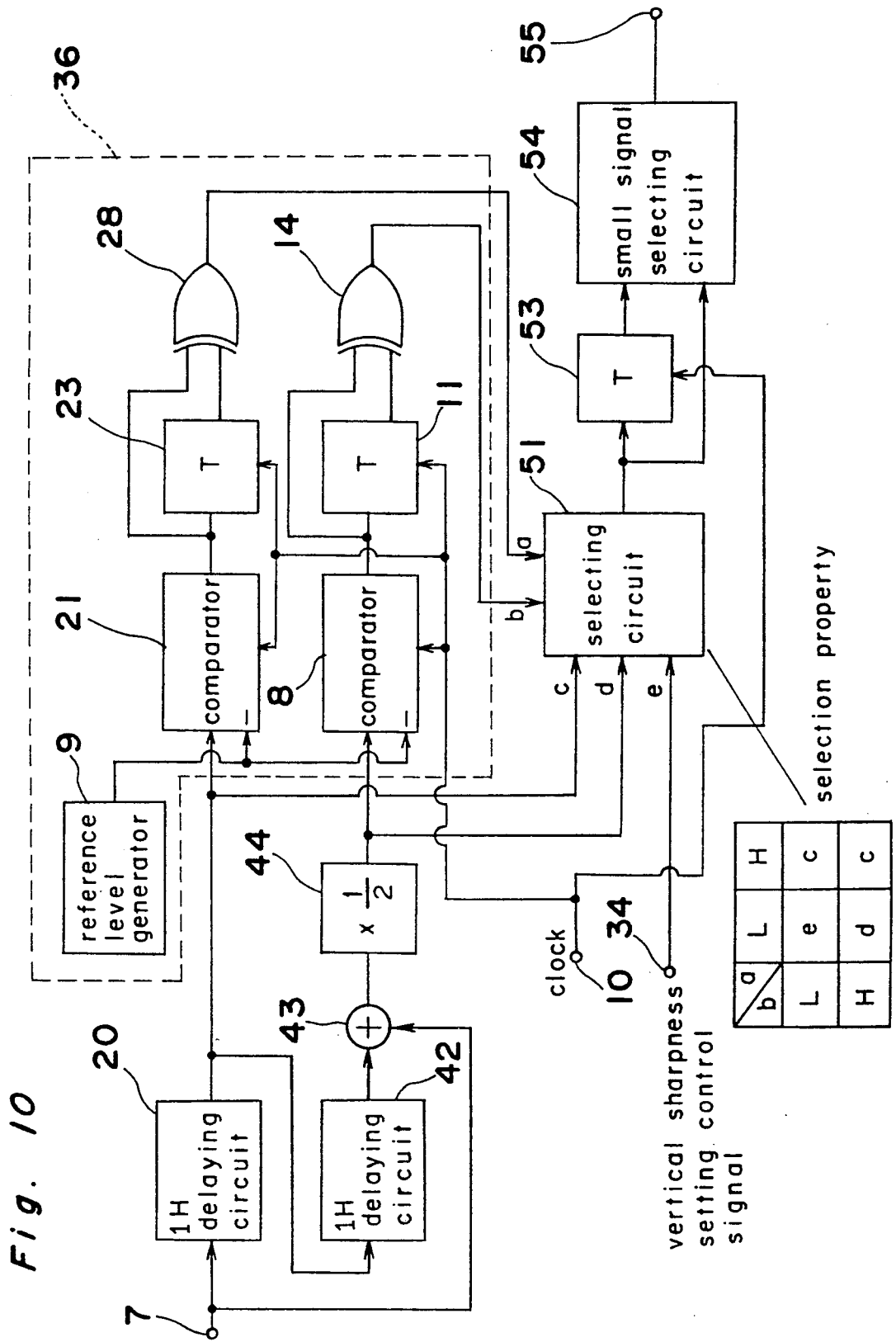

FIG. 9 is a first detailed construction example of the fifth signal level detecting circuit, where the circuit of FIG. 6 (a) is used in the signal level detecting circuit 2 of the example of FIG. 7 so as to effect small modifications. In FIG. 9, the saturation detecting signal of two signals, the signal through the 1H delaying circuit and the signal not delayed by the 1H delaying circuit are fed into the control terminals a, b independently as the control signal into the selecting circuit 51 from the saturation detecting circuit 36. The signal passing through the 1H delaying circuit, the signal not passing through the 1H delaying circuit, the vertical sharpness setting control signal are respectively guided into three input terminals c, d, e of the selecting circuit 51. The selecting circuit 51 selects the signal of the input terminal d when the control input of the control terminal b is high at level, the signal of the input terminal c when the control input of the control terminal a is high at level, the signal of the input terminal e when the control input of the control terminals a and b are both low at level, the input terminal c or d (although the smaller signal of the input terminals c, d may be ideally selected, either of two signal may be selected) when the control inputs of the control terminals a and b are both high at level. The output signal of the selecting circuit 51 is guided into the 1 picture element delaying circuit 53 and the small signal selecting circuit 54. The signal corresponding to the signal level of the picture element not saturated of the saturated horizontal lien or (when the signal is not saturated) the vertical sharpness setting control signal is outputted into the output terminal 55, with effects the same as in the example of FIG. 7 being obtained. By the above described construction, the 1 picture element delaying circuit and the small signal selecting circuit may be omitted by one respectively by the application of the circuit of FIG. 6 (a) as it is into FIG. 7.

(8) (Embodiment: Detailed Construction Example 2 Of Fifth Signal Level Detecting Circuit)

FIG. 10 is a second detailed construction example of the fifth signal level detecting circuit, where the circuit of FIG. 6 (b) is used in the signal level detecting circuit 2 of FIG. 7, further the output signal of the 1 H delaying circuit 20, and the signal, where the signal delayed further by the second 1H delaying circuit 42, and the original input signal (signal not delayed) are averaged by the adding circuit 43 and X ½ circuit 44, are used as input signals. As the example is used, and further the output signal of the 1H delaying circuit 20 is sued for the luminance signal separating circuit 4 of FIG. 1, the vertical sharpness correcting signal may be controlled by the signal condition of all the adjacent three lines including the line of the horizontal lines for obtaining the luminance signal, so that the control operation may be effected more correctly and the signal level difference caused between the lines may be controlled to minimum.

(9) (Embodiment: Two Line Average Luminance Signal Construction When Saturation Caused)

Figure 11:
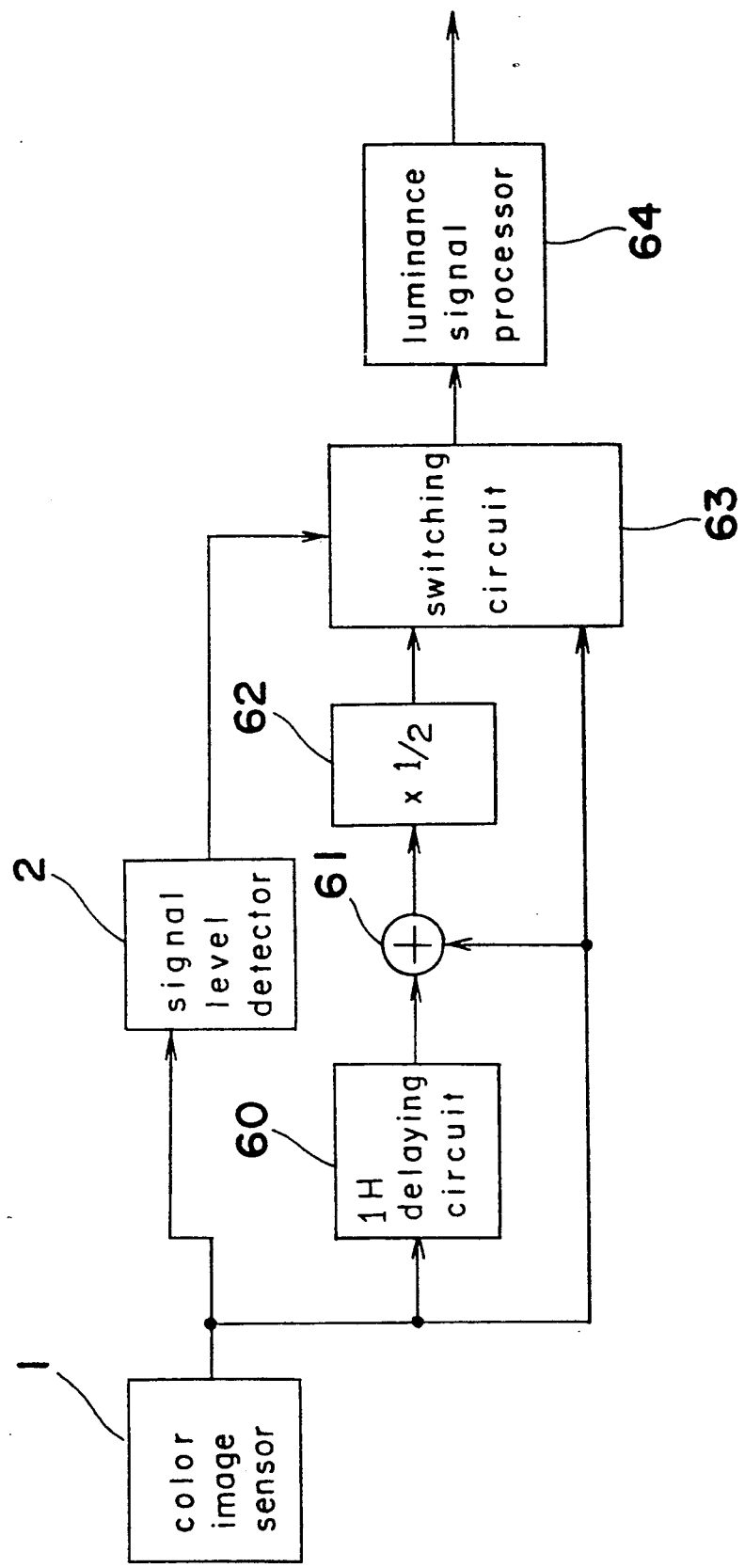
FIG. 11 and FIG. 12 are block diagrams showing the first and second embodiments of a color image pickup apparatus of a second invention of the present invention.

FIG. 11 is a block diagram of a first embodiment of the second invention. The difference with respect to the first invention of FIG. 1 is in the signal level difference between the horizontal lines is corrected by the controlling operation of the vertical sharpness correcting signal when the saturation of the signal has been caused in the first invention, while the signal level difference between the horizontal lines is adapted to be removed, so that the luminance signal may be obtained from the average signal of the signals of the adjacent two lines when the saturation of the signal has been caused in the second invention.

Figure 13:
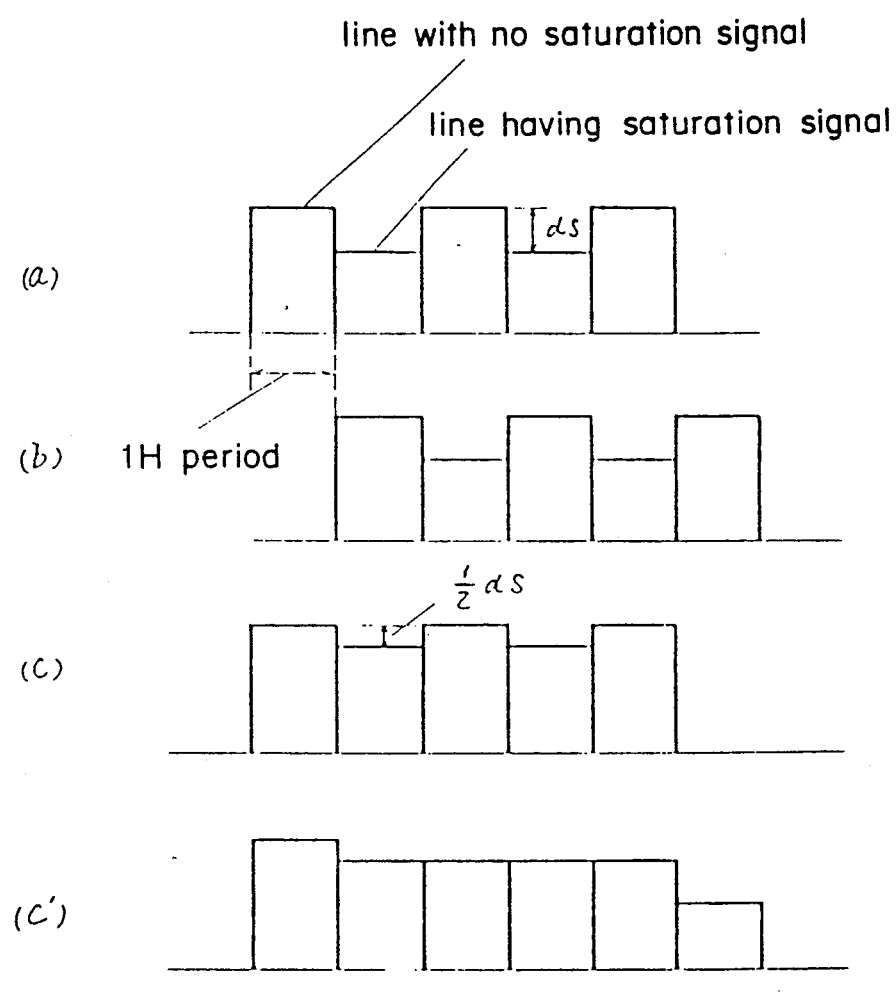
FIG. 13 is a wave form chart for explaining the characteristics of the embodiments of FIG. 11 and FIG. 12.

Assume that the signal where the signal level difference between the horizontal lines by the saturation of the signal is outputted as shown in FIG. 13, the wave form (a) as described in the paragraph of the first invention from the color image sensor 1 in FIG. 11. The signal is guided into the signal level detecting circuit 2 which is the same as that used in the first invention, so that the saturation condition of the signal similar to that in the first invention is detected. The signal from the color image sensor 1 is guided into one input terminal of the switching circuit 63. This signal, and the signal (namely, average signal of two adjacent lines) where the signal (FIG. 13, the wave form (a)) delayed by 1H by the 1H delaying circuit 60 and the signal not delayed (FIG. 13, the wave form (b)) are averaged by the adding circuit 61 and the X½ circuit 62 are switched by the control signal from the signal level detecting circuit 2 and is guided into the luminance signal processing circuit 64. The switching circuit 63 selects and outputs the signal from the color image sensor 1 when the saturation of the signal is not caused, and selects and outputs the average signal of two lines when the saturation of the signal is caused. Therefore, the luminance signal good in the vertical resolution for each of the respective horizontal lines will be the output of the luminance signal processing circuit 64 when the saturation of the signal is not caused. When the saturation of the signal is caused, the signal where the signal level difference between the lines are corrected. When the signal from the color image sensor 1 is a signal shown in FIG. 13, the wave form (a), the signal becomes one of FIG. 13, the wave form (c) or (c)′. FIG. 13, the wave form (c) is the output signal when the signal level detecting circuit (2) is adapted to generate the control signal corresponding to the saturation condition of the signal of the one horizontal line as in the example of FIG. 4(a), (b), and the signal level difference dS between the lines is reduced in ½. FIG. 13, the wave form (c)′ is the output signal when the signal level detecting circuit is adapted to generate the control signal corresponding to the saturation condition of the signal of two horizontal lines as shown in the example of FIG. 6 (a), (b), and the signal level difference between the lines are corrected into zero.

(10) (Embodiment: Partial Common Construction Of Signal Processing, Signal Level Detecting Circuit)

Figure 12:
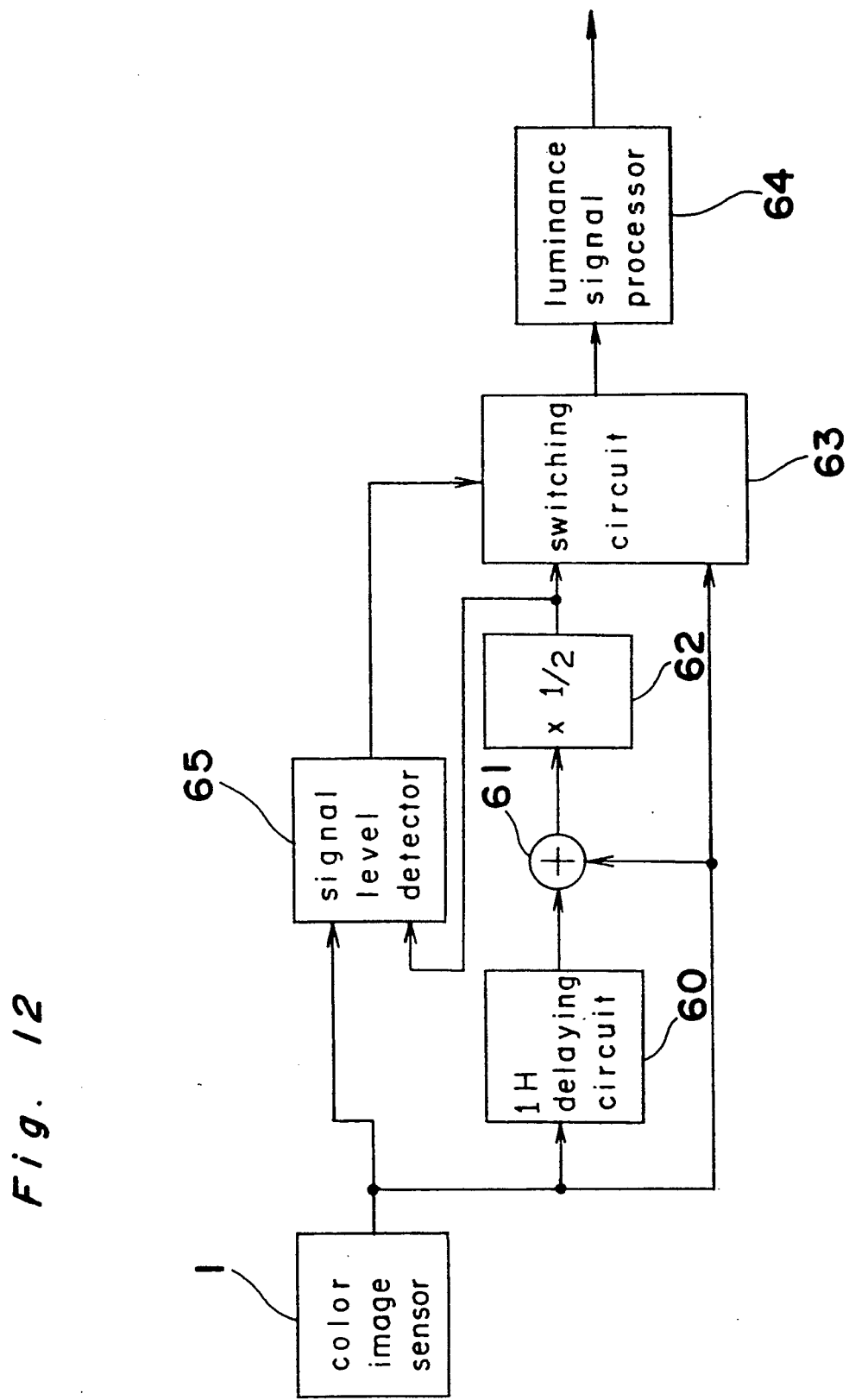

FIG. 12 is a block diagram of a second embodiment of the second invention, is an example where the 1H delaying circuit within the signal level detecting circuit 65 is adapted to be omitted when the signal level detecting circuit 65 is adapted to generate the control signal corresponding to the saturation condition of the signals of two X ½ circuits 62 of the first embodiment of the second invention of FIG. 1, namely, the average signal of the adjacent tow lines are adapted to be also guided into the signal level detecting circuit 65. As the action and effect of the embodiment are the same as that in the embodiment of FIG. 11, the description is omitted. Although the output of the X½ circuit 62 is adapted to be guided into the signal level detecting circuit 65 in the embodiment, the output of the 1H delaying circuit 60 may be, needless to say, constructed to be guided into the signal level detecting circuit 65.

As the switching circuit 63 basically effects the on . off control in the second invention of the present invention of the above described FIG. 11 and FIG. 12, such saturation detecting circuit as in FIG. 4(a), (b) or FIG. 6 (a), (b) is proper in the signal level detecting circuit.

Although nothing is described about the vertical sharpness correction in the above described second invention, the vertical sharpness correcting circuit may be included in the interior of the luminance signal processing circuit 64, the vertical sharpness correction signal generating circuit may be provided in addition so that the vertical sharpness correcting operation may be effected with the output of the luminance signal processing circuit 64.

(11) (Embodiment: Two Line Average Brilliance Signal Construction)

Figure 14:
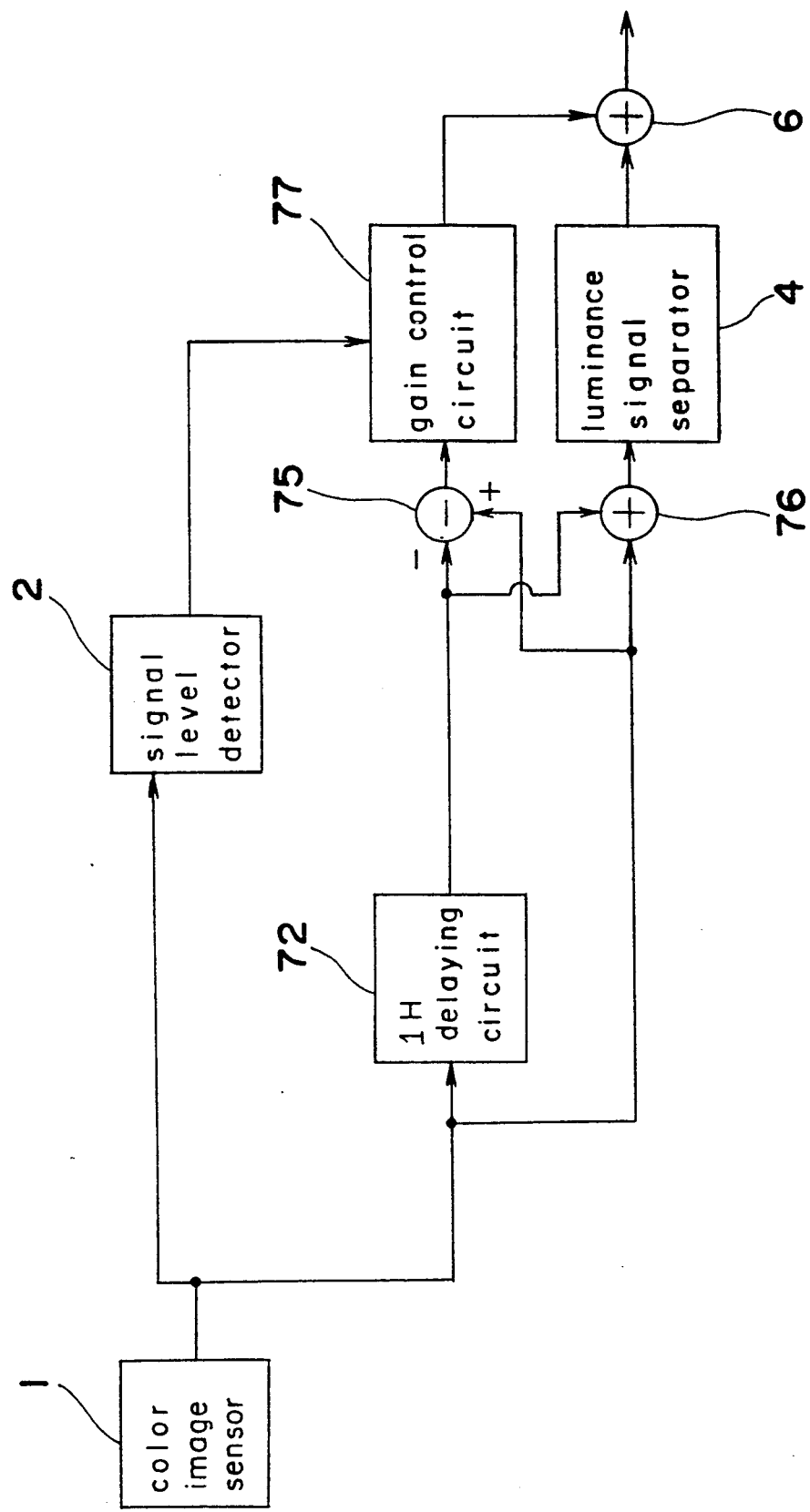
FIG. 14 is a block diagram showing a first embodiment of the color image pickup apparatus of a third invention of the present invention.

FIG. 14 is a block diagram of a first embodiment of the third invention, in the difference between the first invention of FIG. 1 and the second invention of FIG. 11, as the first invention generates the luminance signal from one signal line, the vertical resolution is good, but the signal having the signal level difference is obtained between the lines when the saturation of the signal has been caused, the signal level difference between the signal horizontal lines is corrected by the controlling of the vertical sharpness correcting signal when the saturation has been caused. Also, in the second invention, the luminance signal is adapted to be obtained from the average signal of the adjacent second lines when the saturation of the signal has been caused, so that the signal level difference between the horizontal lines are adapted to be removed. In the third invention, the luminance signal is adapted to be obtained from the average signal of the signals of the adjacent two lines of signals or the weighted average signal of the signals of the adjacent three lines of signals by the combination of the above described first and second invention, so that the luminance signal good at the vertical resolution is obtained when the saturation of the signal has not been caused by the addition of the vertical sharpness correcting signal controlled by the signal level detecting circuit output upon the signal, the luminance signal corrected in the signal level difference between the lines may be obtained when the saturation of the signal has been caused.

As shown in FIG. 14, the signal from the color image sensor 1 is detected at the level of the signal by the signal level detecting circuit 2 as in the embodiment of the invention given so far, and the control signal corresponding to the condition of the signal is outputted. Therefore, the construction of FIG. 7, FIG. 9, FIG. 10 is suitable as the signal level detecting circuit 2.

The signal from the color image sensor 1 is guided into the 1H delaying circuit 72, and the signal delayed by 1H and the signal not delayed are guided into the adding circuit 76 and the subtracting circuit 75. The output signal of the adding circuit 76 becomes the average signal of the adjacent two lines, is guided into the luminance signal separating circuit 4, so that the main luminance signal is obtained. The signal is not caused in the signal level difference between the lines even when the signal has been saturated, but is not normally good in the vertical sharpness. The output signal of the subtracting circuit 76 is the difference signal, namely, the vertical edge signal of adjacent two lines, and therefore, becomes the signal for vertical sharpness correcting use. The output signal of the subtracting circuit 76 is gain controlled with the control signal from the signal level detecting circuit 2 by the gain control circuit 77. The output of the gain control circuit 77 is added, to the main luminance signal from the luminance signal separating circuit 4 by the adding circuit 6. The gain control circuit 77 controls the gain of the vertical sharpness correcting signal so that the vertical sharpness may be established into the desired value when the signal has not been saturated, and so that the gain of the vertical sharpness correcting signal may be controlled in accordance with the saturation level when the saturation of the signal is caused. Therefore, in the output of the adding circuit 6, the luminance signal good in the vertical resolution for each of the respective horizontal lines when the saturation of the signal has not been caused is obtained. The signal corrected in the signal level difference between the lines is obtained when the saturation of the signal has been caused is obtained.

(12) (Embodiment: Three Line Weighted Average Luminance Signal Construction)

Figure 15:
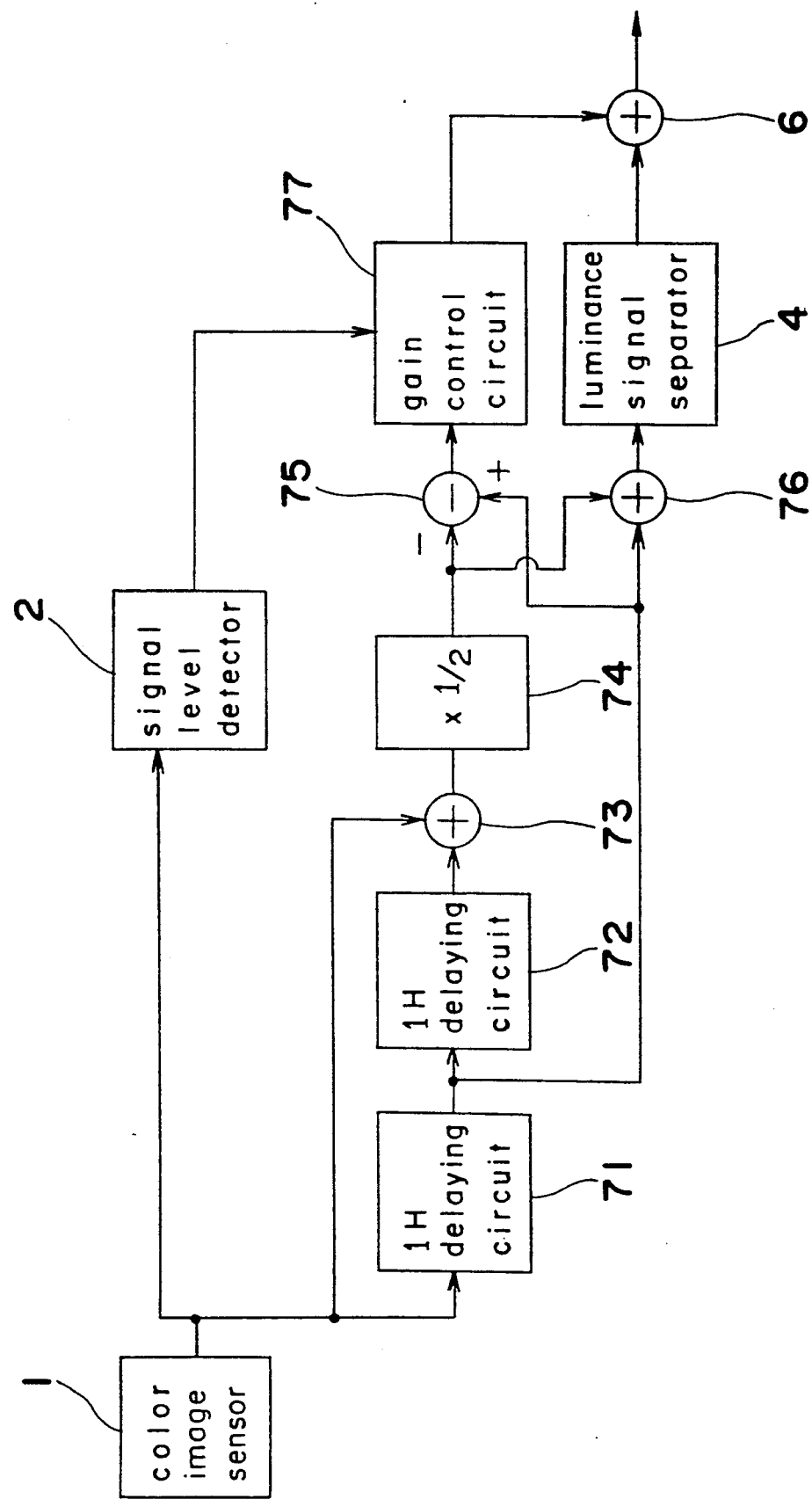
FIG. 15 is a block diagram showing a second embodiment of a color image pickup apparatus of a third invention of the present invention.

FIG. 15 is a block diagram of the second embodiment of the third invention. The difference with respect to the first embodiment of the third invention of FIG. 14 is in that the signal to be guided to the adding circuit 76 and the subtracting circuit 76 is turned into a first signal with the output signal of the color image sensor 1 being delayed by 1H by the 1H delaying circuit 71, and into a second signal wherein the output signal of the color image sensor 1 and the signal which has delayed the output signal of the 1H delaying circuit 71 by 1H further by the 1H and X ½ circuit 74. By such construction, the luminance signal and the vertical sharpness correcting signal may be fundamentally obtained from the adjacent three liens, further the vertical sharpness corresponding signal may be controlled by all the three line signal condition, and the continuous control may be effected more correctly for each of the lines, so that the luminance signal which is gentle, smaller in the deterioration of the vertical sharpness, and smaller in the signal level difference caused among the lines.

Even in the above described embodiments of FIG. 14 and FIG. 15, as in the embodiment of the FIG. 12, the output signal of the 1H delaying circuit 72 in FIG. 14, the output signal of the X ½ circuit 74 in FIG. 15, or the output signal of the 1H delaying circuit 71 and the 1H delaying circuit 72 are adapted to be also guided into the signal level detecting circuit 65 of FIG. 12. When the signal level detecting circuit 65 is adapted to generate the control signal corresponding to the saturation condition of the two horizontal line signal, it is clear that 1H delaying circuit within the signal level detecting circuit 65 is adapted to be omitted.

Although the analog processing digital processing has not been referred to as the signal processing system in the description of the embodiment of the above described present invention, it is clear that the present invention may be achieved even in any processing system, As the signal level detecting circuit in the above described embodiment is proper to detect the signal level for each of the picture elements, the digital processing is easier to realize. In the case of the digital processing, the processing for converting the output signal of the color image sensor 1 into the digital signal by the A/D converting circuit becomes necessary in all the above described embodiments.

The present invention is not restricted to the color image sensor 1 with the color filters shown in FIG. 2 being arranged. It is clear that the present invention may be applied to the general color image sensor on which the color filters are arranged, which are adapted to output the information from the object to be photographed as the different color signals for each of the horizontal lines.

Although the present invention has been fully described by way of example with reference to the accompanying drawings, it is to be noted here that various changes and modifications will be apparent to those skilled in the art. Therefore, unless otherwise such changes and modifications depart form the scope of the present invention, they should be construed as included therein.

What is claim is:

1. A color image pickup apparatus comprising
    a color image sensor for taking out the color information from the object to be photographed, as a color signals different for each of the horizontal lines having a color filter arrangement,
    a signal level detecting circuit for detecting the signal level for each of the picture elements of the above described color image sensor, and generating the control signal when the signal level is larger than the reference level,
    a luminance signal separating circuit for separating the luminance signal from the output signal of the above described color image sensor,
    a vertical sharpness correcting signal generating circuit from the output signal of the above described image sensor or from the above described luminance signal, a control circuit for controlling the above described correcting signal by the above described signal level detecting output, an adding circuit for composing the output signal of the above described control circuit and the above described luminance signal, where the luminance signal corrected in the sharpness is adapted to be obtained by the output of the above described adding circuit.

2. A color image pickup apparatus according to with the claim 1, where the control circuit is adapted to effect the control operation in such a direction as to make the signal level of the correcting signal small by the signal level detecting circuit output.

3. A color image pickup apparatus according to with the claim 1, where the control circuit is adapted to effect the polarity inversion of the correcting signal and the signal level control but he signal level detecting circuit output.

4. A color image pickup apparatus comprising a color image sensor for taking out the color information from the object to be photographed, as color signals different for each of the horizontal lines having a color filter arrangement, a signal level detecting circuit for detecting the signal level for each of the picture elements of the above described color image sensor, and generating the control signal when the signal level is larger than the reference level, an adding circuit for composing at least two horizontal line signal of the output signal of the above described the color image sensor, a switching circuit for selecting the output signal of the above described adding circuit and the output signal of the above described the color image sensor by the output signal of the above described signal level detecting circuit, a luminance signal separating circuit for obtaining the luminance signal from the above described switching circuit output signal, where the above described witching circuit is adapted to select the above described adding circuit output when the above described signal level detecting circuit output has been caused.

5. A color image pickup apparatus comprising a color image sensor for taking out as the different color signals for each of horizontal lines the color information from the object to be photographed having a color filter arrangement, a signal level detecting circuit for detecting the signal level for each of the picture elements of the above described the color image sensor and generating the control signal when the signal level is larger than the reference level, a delaying circuit for delaying by one horizontal scanning period the output signal of the above described the color image sensor, a first adding circuit for adding the output signal of the above described delaying circuit and the output signal of the above described color image sensor, a subtracter for subtracting the output signal of the above described delaying circuit form the above described color image sensor output signal, a separating circuit for separating the luminance signal from the above described color image sensor output signal or the output signal of the above described first adding circuit, a correction signal generating circuit for generating the correcting signal for correcting the sharpness in the vertical direction form the output signal of the above described subtracter, a gain control circuit for controlling in a direction of reducing the signal level of the correcting signal from the above described signal level detecting circuit output, a second adding circuit for composing the output signal of the above described gain control circuit and the above described luminance signal, wherein the luminance signal corrected in the sharpness is adapted to be obtained by the output of the above second adding circuit.

6. A color image pickup apparatus comprising a color image sensor for taking out as the different color signal for each of horizontal lines the color information from the object to be photographed having a color filter arrangement.

a signal level detecting circuit for detecting the signal level for each of the picture elements of the above described a color image sensor and generating the control signal when the signal level is larger than the reference level, a first delaying circuit for delaying by one horizontal scanning period the output signal of the above described the color image sensor, a second delaying circuit for delaying by one horizontal scanning period the output signal of the above described first delaying circuit, a first adding circuit for adding the output signal of the above described the color image sensor and the output signal of the above described second delaying circuit, a multiplication circuit for making the output signal of the above described first adding circuit one time/two times, a second adding circuit for adding the output signal of the above described first delaying circuit and the output signal of the above described multiplication circuit, a subtracter for subtracting the output signal of the above described multiplication circuit from the output signal of the above described first delaying circuit, a luminance signal separating circuit for separating the luminance signal from the output signal of the above described second adding circuit, a correction signal generating circuit for generating the correcting signal for correcting the sharpness in the vertical direction from the output signal of the above described subtracter, a gain control circuit for controlling in a direction of reducing the signal level of the above described correcting signal by the above described signal level detecting circuit output, a third adding circuit for composing the output signal of the above described gain control circuit and the above described luminance signal, wherein the luminance signal corrected in the sharpness is adapted to be obtained from the output from the above described third adding circuit.

7. A color image pickup apparatus according to either of the claims 1, 4, 5, 6, wherein the signal level detecting circuit generates the control signals when the signal level of at least one picture element is larger than the reference level with the adjacent two picture element in the horizontal direction being provided as one unit.

8. A color image pickup apparatus according to either of the claims 1, 4, 5, 6, wherein the signal level detecting circuit generates the control signals when the signal level of at least one picture element is larger than the reference level with four picture elements, the adjacent two picture elements in the horizontal direction and the adjacent two picture elements in the vertical direction, being provided as one unit.

9. A color image pickup apparatus according to either of the claims 1, 4, 5, 6, wherein the signal level detecting circuit generates the control signal corresponding to the signal level of the picture element whose signal level is smaller from between the two picture elements of above described one unit when the signal level of at least one picture element is larger than the reference level with the adjacent two picture elements in the horizontal direction being provided as one unit.

10. A color image pickup apparatus according to either of the claims 1, 4, 5, 6, wherein the signal level detecting circuit generates the control signal corresponding to the signal level of the picture element whose signal level is smaller from between two picture elements of one unit of the horizontal line to which the picture element whose signal level is larger than the reference level belongs when the signal level of at least one picture element is larger than the reference level with four picture elements, the adjacent two picture elements in the horizontal direction and the adjacent two picture elements in the vertical direction, being provided as one unit.

* * * * *

UNITED STATES PATENT AND TRADEMARK OFFICE
CERTIFICATE OF CORRECTION

PATENT NO. : 5,144,399

DATED : September 1, 1992

INVENTOR(S) : Masaaki NAKAYAMA and Yoshinori KITAMURA

It is certified that error appears in the above-identified patent and that said Letters Patent is hereby corrected as shown below:

Title Page between items [22] and [51] add:
--[30] Foreign Application Priority Data
  June 12, 1990 [JP] Japan.............2-153656--.

Signed and Sealed this

Twenty-eighth Day of September, 1993

Attest:

BRUCE LEHMAN

Attesting Officer

Commissioner of Patents and Trademarks